United States Patent
Bloch et al.

(10) Patent No.: US 12,488,473 B1
(45) Date of Patent: Dec. 2, 2025

(54) MULTI-BARCODE DETECTION IN A REAL SCENE USING INTERFACE ENHANCEMENT BASED ON USER INPUT

(71) Applicant: Scandit AG, Zurich (CH)

(72) Inventors: Matthias Bloch, Zurich (CH); Ugur Kart, Tampere (FI); Christian Floerkemeier, Zurich (CH); Bernd Schoner, New York, NY (US); Suren Vagharshakyan, Tampere (FI)

(73) Assignee: Scandit AG, Zurich (CH)

( * ) Notice: Subject to any disclaimer, the term of this patent is extended or adjusted under 35 U.S.C. 154(b) by 211 days.

(21) Appl. No.: 18/502,874

(22) Filed: Nov. 6, 2023

Related U.S. Application Data

(63) Continuation-in-part of application No. 17/890,087, filed on Aug. 17, 2022, now Pat. No. 11,880,738, which is a continuation-in-part of application No. 17/863,253, filed on Jul. 12, 2022, now Pat. No. 11,810,304, which is a continuation of application (Continued)

(51) Int. Cl.
| | | |
|---|---|---|
| G06K 7/14 | (2006.01) | |
| G01S 17/894 | (2020.01) | |
| G06K 7/10 | (2006.01) | |
| G06T 7/194 | (2017.01) | |
| G06T 7/521 | (2017.01) | |
| G06V 10/26 | (2022.01) | |
| G06V 20/62 | (2022.01) | |
| G06V 30/10 | (2022.01) | |

(52) U.S. Cl.
CPC ............ *G06T 7/194* (2017.01); *G01S 17/894* (2020.01); *G06K 7/10722* (2013.01); *G06K 7/1413* (2013.01); *G06T 7/521* (2017.01); *G06V 10/26* (2022.01); *G06V 20/63* (2022.01); *G06V 30/10* (2022.01)

(58) Field of Classification Search
CPC .......................... G06K 7/1408; G06K 7/1443
USPC ................................ 235/462.01, 454, 462.45
See application file for complete search history.

(56) References Cited

U.S. PATENT DOCUMENTS

| | | |
|---|---|---|
| 4,167,756 A | 9/1979 | Smith |
| D344,261 S | 2/1994 | Watanabe |

(Continued)

FOREIGN PATENT DOCUMENTS

| | | |
|---|---|---|
| EP | 3167404 A1 | 5/2017 |
| JP | 2004032507 A | 1/2004 |

(Continued)

OTHER PUBLICATIONS

"Code Reader 4405 User Manual", Code Product Line Version 03, Release date: Jan. 2016,. Code Corporation, Accessed on: Dec. 22, 2020 [Online]. Retrieved from: https://web.archive.org/web/20181223184651/http://www.codecorp.com/products.php?id=167, 16 pages.

(Continued)

*Primary Examiner* — Paultep Savusdiphol
(74) *Attorney, Agent, or Firm* — Kilpatrick Townsend & Stockton LLP

(57) ABSTRACT

Scanning for optical patterns in a real scene using one or more images of the real scene acquired by a camera can sometimes miscount a number of optical patterns in the scene. An interface is provided to allow a user to adjust a count of the number of optical patterns.

20 Claims, 23 Drawing Sheets

Related U.S. Application Data

No. 17/385,604, filed on Jul. 26, 2021, now Pat. No. 11,417,001.

(60) Provisional application No. 63/588,147, filed on Oct. 5, 2023, provisional application No. 63/311,629, filed on Feb. 18, 2022, provisional application No. 63/233,947, filed on Aug. 17, 2021, provisional application No. 63/057,135, filed on Jul. 27, 2020.

(56) References Cited

U.S. PATENT DOCUMENTS

| | | |
|---|---|---|
| 5,744,815 A | 4/1998 | Gurevich et al. |
| D473,872 S | 4/2003 | Ausems et al. |
| 6,580,453 B1 | 6/2003 | Hirasawa |
| D576,197 S | 9/2008 | Takagi |
| 7,457,407 B2 | 11/2008 | Sun et al. |
| D654,931 S | 2/2012 | Lemelman et al. |
| D658,174 S | 4/2012 | Tasselli et al. |
| D659,564 S | 5/2012 | Baxter |
| 8,223,203 B2 | 7/2012 | Ohsumi et al. |
| D667,823 S | 9/2012 | Merenda |
| D670,278 S | 11/2012 | Hamann |
| D672,386 S | 12/2012 | Matunuma et al. |
| D678,870 S | 3/2013 | Fathollahi |
| D678,936 S | 3/2013 | Oliver |
| D685,360 S | 7/2013 | Chen et al. |
| D688,654 S | 8/2013 | Stevinson |
| 8,596,540 B2 | 12/2013 | Adelmann |
| D698,772 S | 2/2014 | Merenda |
| D710,343 S | 8/2014 | Chandler, Jr. et al. |
| D710,346 S | 8/2014 | Smith et al. |
| 8,798,453 B2 | 8/2014 | Lawton |
| D716,285 S | 10/2014 | Chaney et al. |
| D716,785 S | 11/2014 | White |
| D717,287 S | 11/2014 | Macrina et al. |
| D717,304 S | 11/2014 | Yturralde et al. |
| D719,167 S | 12/2014 | Brown et al. |
| D724,573 S | 3/2015 | Stevinson |
| D726,701 S | 4/2015 | Stevinson |
| 9,019,420 B2 | 4/2015 | Hurst et al. |
| D728,551 S | 5/2015 | Saeki et al. |
| D732,011 S | 6/2015 | Stevinson |
| D733,112 S | 6/2015 | Chaney et al. |
| D734,336 S | 7/2015 | Mistkawi et al. |
| D744,470 S | 12/2015 | Stevinson |
| D748,085 S | 1/2016 | Merenda |
| D754,114 S | 4/2016 | Curtis et al. |
| D754,650 S | 4/2016 | Curtis et al. |
| D759,004 S | 6/2016 | Stevinson |
| D760,209 S | 6/2016 | Weng et al. |
| D760,212 S | 6/2016 | Mao et al. |
| D760,710 S | 7/2016 | Ozolins et al. |
| D761,240 S | 7/2016 | Ozolins et al. |
| D768,617 S | 10/2016 | Merenda |
| D771,631 S | 11/2016 | Fitch et al. |
| 9,654,675 B2 | 5/2017 | Kessler |
| 9,659,204 B2 | 5/2017 | Wu et al. |
| 10,013,643 B2 | 7/2018 | Yellapragada et al. |
| 10,025,886 B1 | 7/2018 | Rublee et al. |
| 10,200,599 B1 | 2/2019 | Baldwin |
| D860,180 S | 9/2019 | Lehmann et al. |
| D862,441 S | 10/2019 | Eppler et al. |
| 10,558,844 B2 | 2/2020 | D'ercoli et al. |
| 10,621,435 B2 | 4/2020 | Bridges et al. |
| 10,846,561 B1 | 11/2020 | Floerkemeier et al. |
| 10,963,658 B1 | 3/2021 | Bloch et al. |
| 11,087,105 B1 | 8/2021 | Biasini et al. |
| 11,216,628 B2 | 1/2022 | Scherly et al. |
| 11,244,147 B2 | 2/2022 | Floerkemeier et al. |
| 11,290,643 B1 | 3/2022 | Tullis et al. |
| 11,295,163 B1 | 4/2022 | Schoner et al. |
| 11,417,001 B1 | 8/2022 | Bloch et al. |
| 2003/0059124 A1 | 3/2003 | Center, Jr. |
| 2003/0202697 A1 | 10/2003 | Simard et al. |
| 2004/0221790 A1 | 11/2004 | Sinclair et al. |
| 2006/0011724 A1 | 1/2006 | Joseph et al. |
| 2006/0075241 A1 | 4/2006 | Deguillaume et al. |
| 2007/0116454 A1 | 5/2007 | Tsai |
| 2007/0119939 A1* | 5/2007 | Epshteyn ............ G06K 7/1093 235/462.08 |
| 2009/0002797 A1 | 1/2009 | Kwong et al. |
| 2009/0033786 A1 | 2/2009 | Finkelstein et al. |
| 2010/0102129 A1 | 4/2010 | Drzymala et al. |
| 2010/0328420 A1 | 12/2010 | Roman |
| 2011/0007205 A1 | 1/2011 | Lee |
| 2011/0043683 A1 | 2/2011 | Beach et al. |
| 2011/0081946 A1 | 4/2011 | Singh |
| 2011/0168776 A1 | 7/2011 | Jalali et al. |
| 2013/0076697 A1 | 3/2013 | Goertz et al. |
| 2013/0175340 A1* | 7/2013 | Endo ................ G06K 7/10821 235/437 |
| 2013/0206839 A1 | 8/2013 | Gao |
| 2013/0329115 A1 | 12/2013 | Palmeri |
| 2013/0341401 A1* | 12/2013 | Kannan ............ G06K 7/10881 235/462.08 |
| 2014/0025973 A1 | 1/2014 | Schillings et al. |
| 2014/0027503 A1 | 1/2014 | Kennedy et al. |
| 2014/0166761 A1* | 6/2014 | Todeschini ........... G06K 7/1443 235/472.01 |
| 2014/0168468 A1 | 6/2014 | Levoy et al. |
| 2014/0171150 A1 | 6/2014 | Hurst et al. |
| 2014/0232930 A1 | 8/2014 | Anderson |
| 2014/0247278 A1 | 9/2014 | Samara et al. |
| 2014/0285913 A1 | 9/2014 | Palmeri |
| 2014/0327815 A1 | 11/2014 | Auger |
| 2015/0001302 A1* | 1/2015 | Gelay ................ G06K 7/10821 235/462.11 |
| 2015/0053765 A1 | 2/2015 | Powell et al. |
| 2015/0116547 A1 | 4/2015 | Laroia |
| 2015/0220766 A1 | 8/2015 | Russell et al. |
| 2016/0042315 A1 | 2/2016 | Field-Darragh et al. |
| 2016/0062359 A1 | 3/2016 | Liao et al. |
| 2016/0068114 A1 | 3/2016 | Liao |
| 2016/0070944 A1 | 3/2016 | McCloskey et al. |
| 2016/0077307 A1 | 3/2016 | Palmeri |
| 2016/0080897 A1 | 3/2016 | Moore et al. |
| 2016/0104021 A1 | 4/2016 | Negro et al. |
| 2016/0171707 A1 | 6/2016 | Schwartz |
| 2016/0188941 A1* | 6/2016 | Todeschini ........... G06K 7/1439 235/462.11 |
| 2016/0253599 A1 | 9/2016 | Lang et al. |
| 2016/0321819 A1 | 11/2016 | Morgan-Mar et al. |
| 2016/0323508 A1 | 11/2016 | Ayalasomayajula et al. |
| 2016/0339587 A1 | 11/2016 | Rublee |
| 2017/0013179 A1 | 1/2017 | Kang et al. |
| 2017/0041540 A1 | 2/2017 | Foster et al. |
| 2017/0243097 A1 | 8/2017 | Loy et al. |
| 2017/0286901 A1 | 10/2017 | Skaff et al. |
| 2017/0315558 A1 | 11/2017 | Vojak |
| 2018/0081417 A1 | 3/2018 | Chan et al. |
| 2018/0101813 A1 | 4/2018 | Paat et al. |
| 2018/0122194 A1 | 5/2018 | Schoner |
| 2018/0137319 A1 | 5/2018 | Giordano et al. |
| 2018/0139337 A1 | 5/2018 | Ghazizadeh |
| 2018/0157885 A1 | 6/2018 | Gurzumar |
| 2018/0314908 A1 | 11/2018 | Lam |
| 2018/0342050 A1 | 11/2018 | Fitzgerald et al. |
| 2019/0065803 A1 | 2/2019 | Burke et al. |
| 2019/0180150 A1 | 6/2019 | Taylor et al. |
| 2019/0213523 A1 | 7/2019 | Adato et al. |
| 2019/0304132 A1 | 10/2019 | Yoda et al. |
| 2019/0354923 A1 | 11/2019 | Taira et al. |
| 2020/0042803 A1 | 2/2020 | Yamaguchi |
| 2020/0084375 A1 | 3/2020 | Tadano et al. |
| 2020/0130864 A1 | 4/2020 | Brockers et al. |
| 2021/0043005 A1 | 2/2021 | Arora et al. |
| 2021/0125141 A1 | 4/2021 | Lipsey et al. |
| 2021/0142019 A1* | 5/2021 | Astvatsaturov .... G06K 7/10881 |
| 2021/0150618 A1 | 5/2021 | Glaser et al. |
| 2021/0158278 A1 | 5/2021 | Bogolea et al. |
| 2021/0192162 A1 | 6/2021 | Rodriguez et al. |

(56) References Cited

U.S. PATENT DOCUMENTS

2021/0375054 A1 12/2021 Pan et al.
2022/0324112 A1 10/2022 Wolowelsky et al.

FOREIGN PATENT DOCUMENTS

| JP | 2019094191 A | 6/2019 |
|---|---|---|
| KR | 20020077090 A | 10/2002 |
| KR | 20060102957 A | 9/2006 |
| WO | 0131893 A1 | 5/2001 |
| WO | 2016007662 A1 | 1/2016 |

OTHER PUBLICATIONS

"Flens—The First Flashlight Booster for Smartphones", created by Basilico, Kickstarter, last updated Dec. 11, 2019, Accessed on Mar. 26, 2021 from https://kickstarter.com/projects/basilico/flen-the-first-flashlight-booster-for-smartphones, 26 pages.

"Linea Pro Extreme Rugged Case". Infinite Peripherals, iOS Accessories, Linea Pro and Infinea Tab Accessories, Retrieved on Dec. 22, 2020 from https://web.archive.org/web/20150825044354/http://ipcprint.com/linea-pro-extreme-rugged-case.html 3 page.

Brownlee; Jason, "Deep Learning Models for Human Activity Recognition", Deep Learning for Time Series, Navigation, last updated Aug. 5, 2019, 16 pages.

Invitation to Pay Additional Fees and, Where Applicable, Protest Fee, mailed Jun. 17, 2021 in International Patent Application No. PCT/US2021/025212, 2 pages.

International Application No. PCT/US2021/025212 received an International Search Report and the Written Opinion mailed Aug. 12, 2001, 11 pages.

U.S. Appl. No. 17/396,123 received a Non-Final Office Action, mailed on Dec. 2, 2021, all pages.

U.S. Appl. No. 17/468,376 received a Notice of Allowance, mailed on Nov. 29, 2021, all pages.

U.S. Appl. No. 17/549,805, Non-Final Office Action, mailed on Mar. 2, 2022, all pages.

U.S. Appl. No. 17/549,805, Notice of Allowance, mailed Jun. 29, 2022, all pages.

U.S. Appl. No. 17/244,251, Notice of Allowance, mailed Jul. 27, 2022, all pages.

U.S. Appl. No. 17/016,896, Notice of Allowance, mailed Nov. 16, 2022, all pages.

U.S. Appl. No. 17/565,131, Notice of Allowance, mailed on Dec. 8, 2022, all pages.

\* cited by examiner

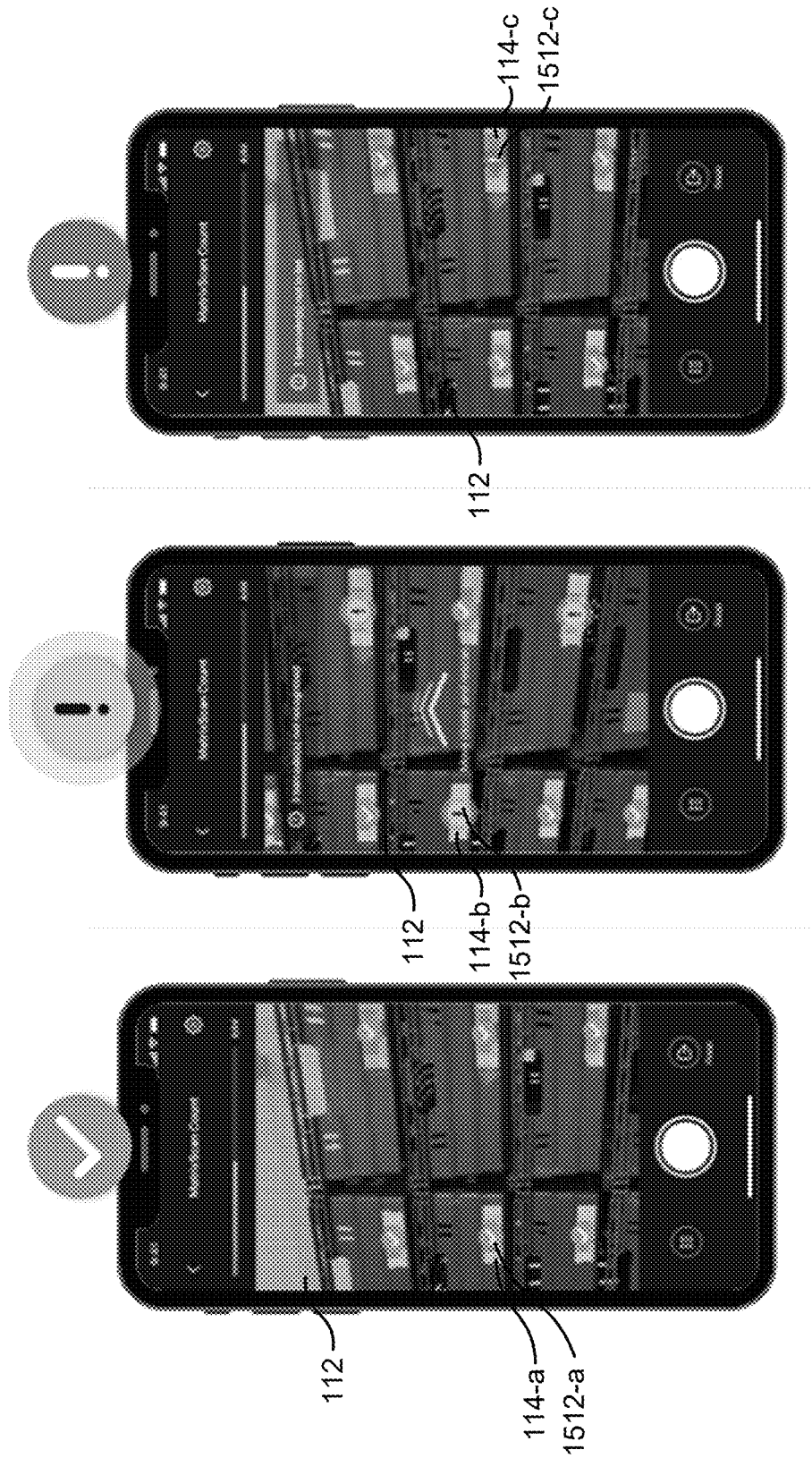

MULTI-BARCODE DETECTION IN A REAL SCENE USING INTERFACE ENHANCEMENT BASED ON USER INPUT

CROSS REFERENCE TO RELATED APPLICATIONS

This application claims priority to U.S. Provisional Patent Application No. 63/588,147, filed on Oct. 5, 2023. This application is a continuation-in-part of U.S. patent application Ser. No. 17/890,087, filed on Aug. 17, 2022, which claims priority to U.S. Provisional Patent Application No. 63/233,947, filed on Aug. 17, 2021, and to U.S. Provisional Patent Application No. 63/311,629, filed on Feb. 18, 2022. The patent applications listed above are incorporated by reference for all purposes.

This application is a continuation-in-part of U.S. patent application Ser. No. 17/863,253, filed on Jul. 12, 2022, now U.S. Pat. No. 11,810,304, scheduled to be issued on Nov. 7, 2023, which is a continuation of U.S. patent application Ser. No. 17/385,604, filed on Jul. 26, 2021, now U.S. Pat. No. 11,417,001, issued on Aug. 16, 2022, which claims priority to U.S. Provisional Patent Application No. 63/057,135, filed on Jul. 27, 2020. The patent applications listed above are incorporated by reference for all purposes.

BACKGROUND

This disclosure relates in general to a camera in a mobile device. More specifically, and without limitation, this disclosure relates to decoding barcodes in a scene or image using the camera in the mobile device. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using as smartphone to decode a barcode is provided in U.S. Pat. No. 8,596,540, granted on Dec. 3, 2013.

BRIEF SUMMARY

Mobile devices having a camera, and being capable of hosting mobile applications, offer a flexible and scalable solution for optical pattern decoding. However, scanning many optical patterns quickly and efficiently can be challenging. There is a need for improved optical-pattern scanning using a camera in a mobile device that can more quickly and/or efficiently scan many optical patterns.

In some configurations, a system for optical pattern scanning comprises a mobile device comprising a camera and a display, and one or more memory devices comprising instructions that, when executed, cause one or more processors to perform the following steps: receiving an image of a scene acquired by the camera of the mobile device; detecting a plurality of optical patterns in the image; decoding the plurality of optical patterns; presenting, on the display of the mobile device, a count of the optical patterns; receiving an input from a user of the mobile device; and/or adjusting, in response to the input, the count of the optical patterns. In some embodiments, the camera is part of a hand-held, mobile device; the plurality of optical patterns are identical; the input comprises pressing a first button to increase the count of the optical patterns; the instructions, when executed, cause the one or more processors to further perform the following steps: presenting, on the display of the mobile device, an indication of decoded optical patterns, and detecting the input from the user, wherein the input is generated by the user based at least in part on the indication of decoded optical patterns; the indication of decoded optical patterns comprises a plurality of augmented reality (AR) overlays, each of the plurality of AR overlays corresponding to one of the decoded optical patterns.

In some configurations, a method comprises receiving an image of a scene acquired by a camera of a mobile device; detecting a plurality of optical patterns in the image; decoding the plurality of optical patterns; presenting, on a display of the mobile device, a count of the optical patterns; receiving an input from a user of the mobile device; and/or adjusting, in response to the input, the count of the optical patterns. In some embodiments, the plurality of optical patterns are identical; the input comprises pressing a first button to increase the count of the optical patterns; the input comprises pressing a second button to decrease the count of the optical patterns; the input comprises manually inputting the count of the optical patterns; the method comprises presenting, on the display of the mobile device, an indication of decoded optical patterns, and/or detecting the input from the user, wherein the input is generated by the user based at least in part on the indication of decoded optical patterns; the indication of decoded optical patterns comprises a plurality of augmented reality (AR) overlays, each of the plurality of AR overlays corresponding to one of the decoded optical patterns; the indication of decoded optical patterns further comprises at least one AR overlays, each of the at least one AR overlays corresponding to an optical pattern that has not been decoded; the method comprises acquiring a depth map of the scene by a ranging system using a laser; the method comprises comparing the decoded optical patterns against a list of expected items and presenting, on the display of the mobile device, a list of scanned items based on comparing the decoded optical patterns against the list of expected items; the image is one of multiple images of the scene; and/or the method comprises tracking a position of a first barcode across the multiple images without decoding the first barcode in each of the multiple images.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

FIG. 17A, FIG. 17B, and FIG. 17C are diagrams illustrating various scanning results in accordance with some embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as barcodes and QR codes, are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. The following techniques can be used individually, in combination with each other, and/or in combination with other techniques.

Figure 1:
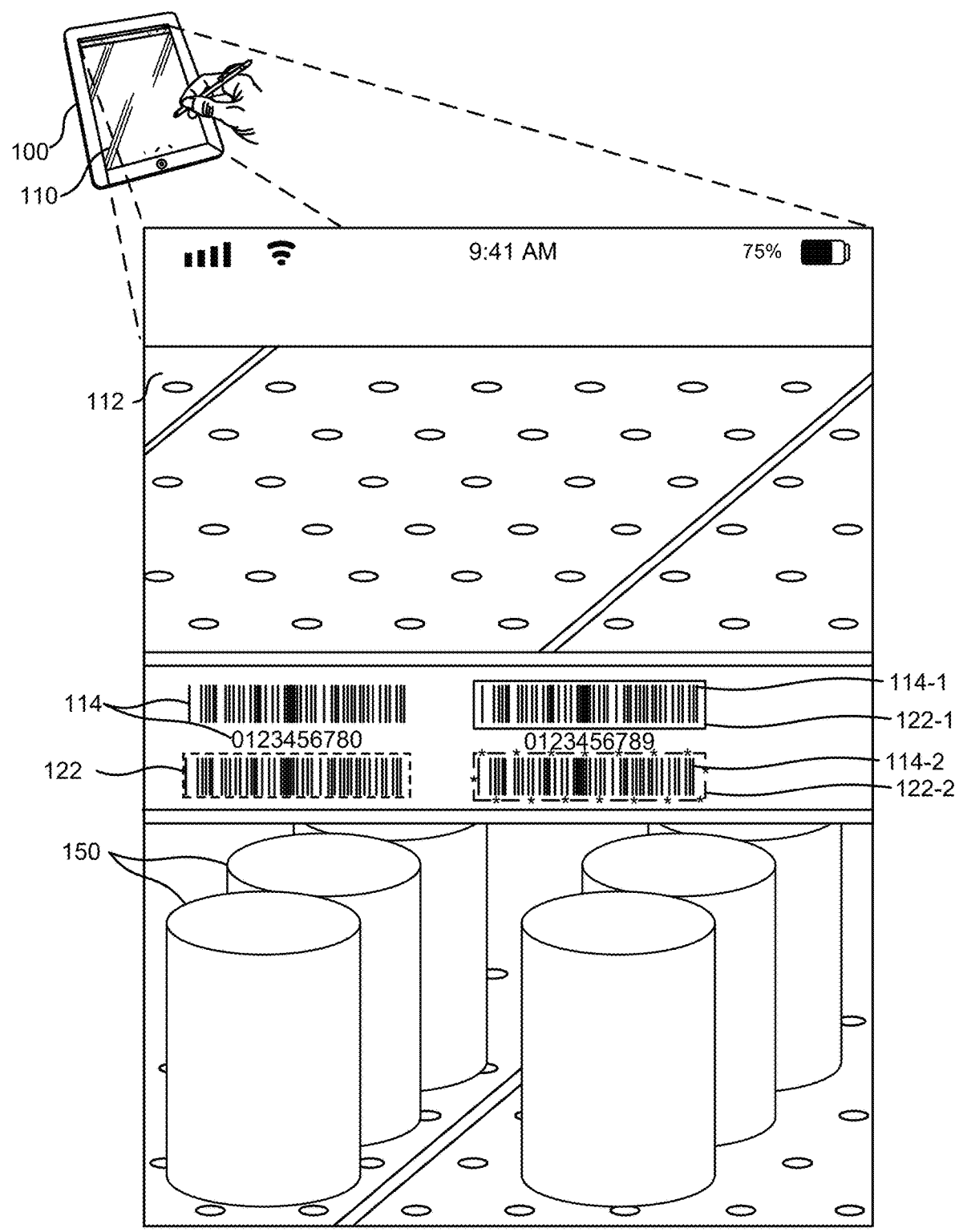
FIG. 1 depicts an example technique for automated recognition and decoding of a pattern in an image containing multiple patterns, in accordance with some embodiments.

FIG. 1 depicts an example technique for automated detection and decoding of one or more optical patterns in an image, in accordance with some embodiments. In FIG. 1, a system 100 (e.g., a mobile device) comprises a display 110 and a camera. The camera has a field of view (FOV) of a real scene. The camera is configured to capture an image 112 of the real scene. The real scene contains one or more optical patterns 114.

The camera can capture a plurality of images. The plurality of images can be presented in "real time" on the display 110 (e.g., presented on the display 110 in a sequential manner following capture, albeit potentially with some latency introduced by system processes). The image 112 is one of the plurality of images. The plurality of images depict the real world scene as viewed through the field of view of the camera. The real world scene may include multiple objects 150, patterns, or other elements (e.g., faces, images, colors, etc.) of which the optical patterns 114 are only a part. FIG. 1 depicts a first optical pattern 114-1 and a second optical pattern 114-2, among other optical patterns 114.

The image 112 may be captured by the camera and/or provided via additional or alternative system processes (e.g., from a memory device, a communications connection to an online content network, etc.). The optical patterns 114 are detected and/or recognized in the image 112. Detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type), specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, an approach can be used to detect a pattern of characters, and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that a user is presented the positions of the optical patterns 114 as well as other metadata, including but not limited to pattern category, decoding status, or information encoded by the optical patterns 114.

The system 100 may identify one or more of the optical patterns 114 for decoding. As mentioned above, the decoding may be automated, initializing upon detection of an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about an optical pattern template category or the number of patterns detected. Following decoding, the first graphical element 122-1 may present information specific to the first optical pattern 114-1. For an optical pattern 114 that is detected, but decoding is unsuccessful, the system 100 may alter a graphical element 122 to indicate decoding failure, as well as other information indicative of a source of the error. As an illustrative example, a second graphical element 122-2 may indicate that the second optical pattern 144-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded or is changed to a green box if the second optical pattern 114-2 is decoded. Examples of graphical elements used during detecting and decoding optical patterns can be found in U.S. application Ser. No. 16/905,722, filed on Jun. 18, 2020, which is incorporated by reference for all purposes. Optical patterns can also be tracked, as described in U.S. patent application Ser. No. 16/920,061, filed on Jul. 2, 2020, which is incorporated by reference for all purposes.

A. Optical Pattern Mapping Workflow

In some embodiments, a system is configured to scan multiple barcodes in a scene. A user is guided towards a good operating point. Motion of a mobile device (e.g., a phone, such as a smartphone, or a tablet) is analyzed. While the mobile device is held still, a scanning process is started. Optical patterns (e.g., barcodes) are detected and/or decoded in one or multiple frames during the scanning process. After the algorithm is confident that the section of the scene has been analyzed, results are presented (e.g., on a screen of the mobile device) to the user. Results can include successfully decoded barcodes (e.g., with a green overlay) and/or locations that the algorithm suspects to contain a barcode but the barcode could not be decoded (e.g., with a red overlay). The mobile device is moved to a next section of the scene to be scanned. While the mobile device is moved, already analyzed part(s) of the scene are augmented with an overlay which allows the user to position the mobile device more efficiently. For example, the mobile device can be moved so that scanned sections to not overlap. After the mobile device is held still, the scanning process is started again, and new codes are detected and/or decoded.

Figure 2:
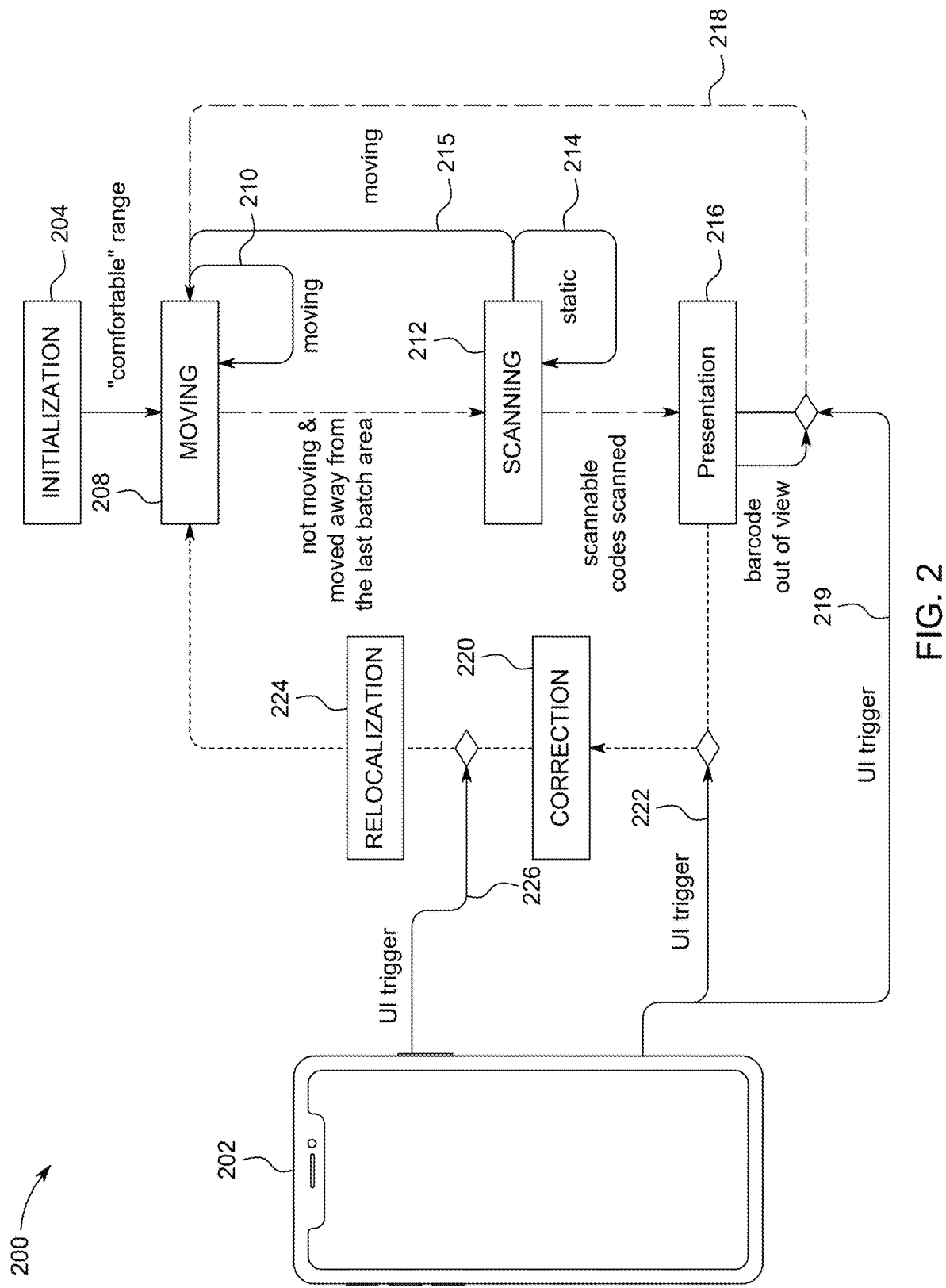
FIG. 2 illustrates a diagram of an embodiment of a workflow of detecting multiple optical patterns in a scene.

In FIG. 2 illustrates a diagram of an embodiment of a workflow 200 of detecting multiple optical patterns in a scene. The workflow 200 is executed on a mobile device 202.

Initialization

Workflow 200 begins in step 204, initialization. During initialization, the user brings the mobile device to an operating distance. A proper operating distance that can accurately scan some codes is better than a greater distance having more codes within a field of view (e.g., to maximize a number of codes within a scene) that cannot be as accurately scanned. In some embodiments, the operating distance is equal to or greater than 30 cm and/or equal to or less than 60, 90, 100, 150, or 200 cm.

In some embodiments, initialization is used because the mobile device 202 is sometimes not at an optimal operating position when the application is started. For example, the camera in the mobile device could be pointing toward the user's feet instead of at a shelf to be scanned. In some embodiments, the operating distance is based on a size of a barcode (e.g., a barcode height and/or width) to be decoded, a line width of a barcode (e.g., for sufficient sharpness and/or pixel size to decode the barcode), and/or resolution of the camera. In some embodiments, a depth measurement and/or a focus distance of the mobile device 202 is used to determine if the mobile device is within the operating distance from objects to be analyzed.

Moving

In step 208, the system determines whether the mobile device 202 is moving. For example, data from non-optical sensors, such as accelerometers, is used to ascertain if the mobile device is moving faster than a predetermined threshold speed, a first threshold. In some embodiments, optical sensors are used. For example, motion blur from images acquired by a camera of the mobile device is used to ascertain if the mobile device is moving faster than the predetermined threshold speed.

While the mobile device is moving beyond the threshold speed, line 210, images from the camera are not being analyzed to detect and/or decode optical patterns. After the speed of the mobile device is below a second threshold (e.g., the same or different from the first threshold), or the mobile device is otherwise ascertained to be sufficiently stable for detecting and/or decoding barcodes, the workflow proceeds to scanning, step 212.

Scanning

In step 212, scanning, the system detects and/or decodes optical patterns. In some embodiments, the system waits until all the optical patterns within a preview of the mobile device are detected, decoded, and/or identified as not decodable before indicating to the user to continue. If the mobile device remains static, line 214, then the system detects and decodes optical patterns. However, if the mobile device is moved, line 215, then the process returns to the moving step 208 (e.g., and scanning is aborted; data about scanned optical patterns can be saved or discarded).

Presentation

After optical patterns are identified, decoded, and/or identified as not decodable (e.g., within a preview area of the camera of the mobile device), the workflow goes to step 216, presentation. In presentation, one or more overlays are presented on a screen of the mobile device to indicate optical patterns that have been decoded and/or optical patterns that have been detected and not decoded. For example, a green overlay (e.g., a dot or rectangle) is placed over a location of an optical pattern that is decoded, and a red overlay (e.g., a dot or rectangle) is placed over a location of an optical pattern that is not decoded. In some embodiments, optical patterns are also tracked, so that the optical patterns are not scanned again in subsequent images, and/or to instruct a user to move the mobile device to a new area to scan.

After presentation, the mobile device is moved, line 218, to a new location in preparation to scan more optical patterns (e.g., if all the codes are detected are/or decoded in one location). In some embodiments, a user-interface (UI) trigger 219 is used (e.g., a screen tap) before proceeding back to moving step 208.

Correction

If there is an optical pattern that is detected (e.g., either automatically or by the user) and not decoded, then the workflow 200 can proceed to step 220, correction. In some embodiments, the system waits for a UI trigger 222 before going to correction. For example, after presentation, a user could be prompted to select to proceed to scan more optical patterns (e.g., UI trigger 219; accept the error(s) and move on) or to select to correct, step 220, the decoding of the optical pattern that was previously not decoded. In some embodiments, if an optical pattern is not decoded, the system forces the user to correct or to accept that the optical pattern is not decoded before moving on.

For correction of scanning of an optical pattern, the user can be instructed to change position of the mobile device (e.g., to move closer, zoom in, and/or to translate the phone). For example, glare from a light reflecting on a label could prevent the optical pattern from being decoded. By repositioning the mobile device, the optical pattern can then be decoded. In some embodiments, a single-scanning barcode mode is implemented to decode the optical pattern that was not decoded. In some embodiments, the optical pattern is damaged and the user can manually enter data and/or accept that the optical pattern will not be decoded. In some embodiments, an aimer is presented to the user (e.g., crosshair, highlighting, and/or bounding box) on a screen of the mobile device for the user to aim at and/or zoom in/out on the barcode that was not decoded.

Re-Localization

In some embodiments, after a user attempts to correct an optical pattern that was not read, the system may have lost track of where the mobile device was in relation to the scene. Re-localization, step 224, can be performed in various ways. For example, the system can decode a unique barcode that was previously decoded to determine where the mobile device is in relation to the scene. In some embodiments, re-localization uses scene features and/or relative barcode position(s) within an image to ascertain the position of the mobile device in relation to the scene. In some embodiments a UI trigger 226 is used to start re-localization.

Example 1

Figure 3:
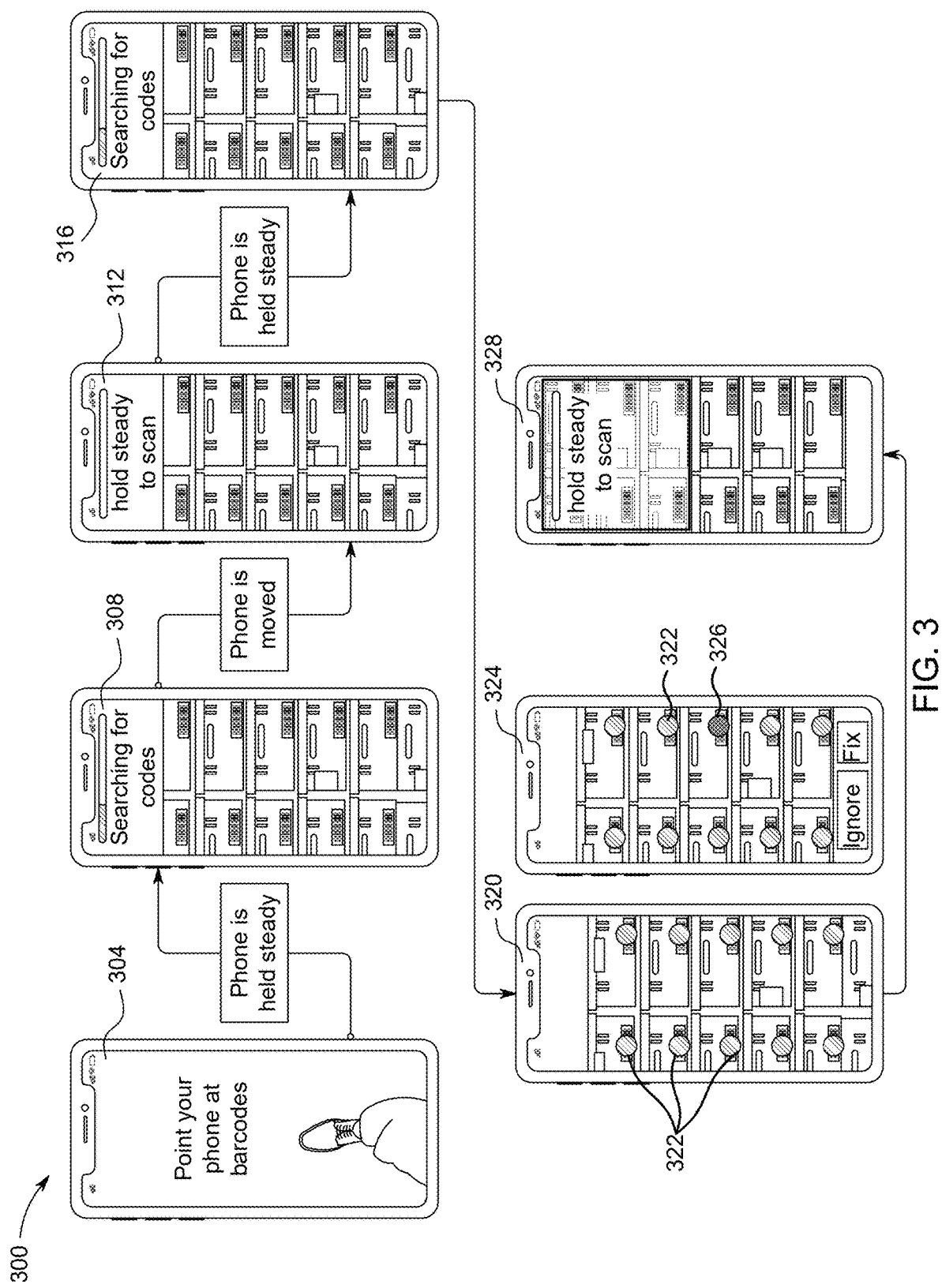
FIG. 3 depicts a first example the workflow for detecting multiple optical patterns in a scene.

FIG. 3 depicts a first example of implementing workflow 200 from FIG. 2. FIG. 3 depicts workflow 300 for detecting multiple optical patterns in a scene. Workflow 300 begins in step 304. In step 304, an application on a mobile device (e.g., the mobile device 202 in FIG. 2) is started and the user is instructed to point a camera of the mobile device toward optical patterns (e.g., barcodes). In step 308, the user points the camera toward a scene comprising optical patterns. The system ascertains that the mobile device is being held steady and begins to scan for optical patterns. The user is shown a progress bar for scanning for optical patterns. In step 312, the mobile device is moved before scanning in step 308 was completed. The user is instructed to hold the mobile device steady (e.g., the scanning step 308 is aborted). In step 316, scanning for optical patterns is performed while the mobile device is held steady.

In step 320, the user is presented results of the scan (e.g., green dots 322 overlaid on locations of decoded barcodes). Step 324 is an alternative to step 320. In step 324, one barcode is detected and not decoded (e.g., shown by a red dot 326). The user can take corrective action to try to decode the barcode that was not decoded.

In step 328, an area of decoded barcodes is indicated by a green box, and the user is instructed to hold the mobile device steady while a new portion of the scene is scanned. After a new area of the scene is scanned, the green box is expanded to show the area that has been scanned.

In some embodiments, scanning is performed over a certain number of images or a certain amount of time. Enough time is spent on scanning for optical patterns (e.g., detecting and decoding) that there is a high certainty (e.g., probability equal to or greater than 90, 95, 98, or 99 percent) that all the optical patterns in the preview are detected and decoded (or cannot be decoded). The presentation step indicates correctly decoded and/or missed optical patterns (e.g., step 320 or step 324). In some embodiments, optical patterns are depicted as decoded in real time (e.g., a green dot shows up on a barcode once the barcode is decoded). In some embodiments, presentation shows all decoded or missed optical patterns at the same time in a preview area (e.g., at the end of the scanning phase), instead of showing barcodes decoded all at one time.

Example 2

Figure 4:
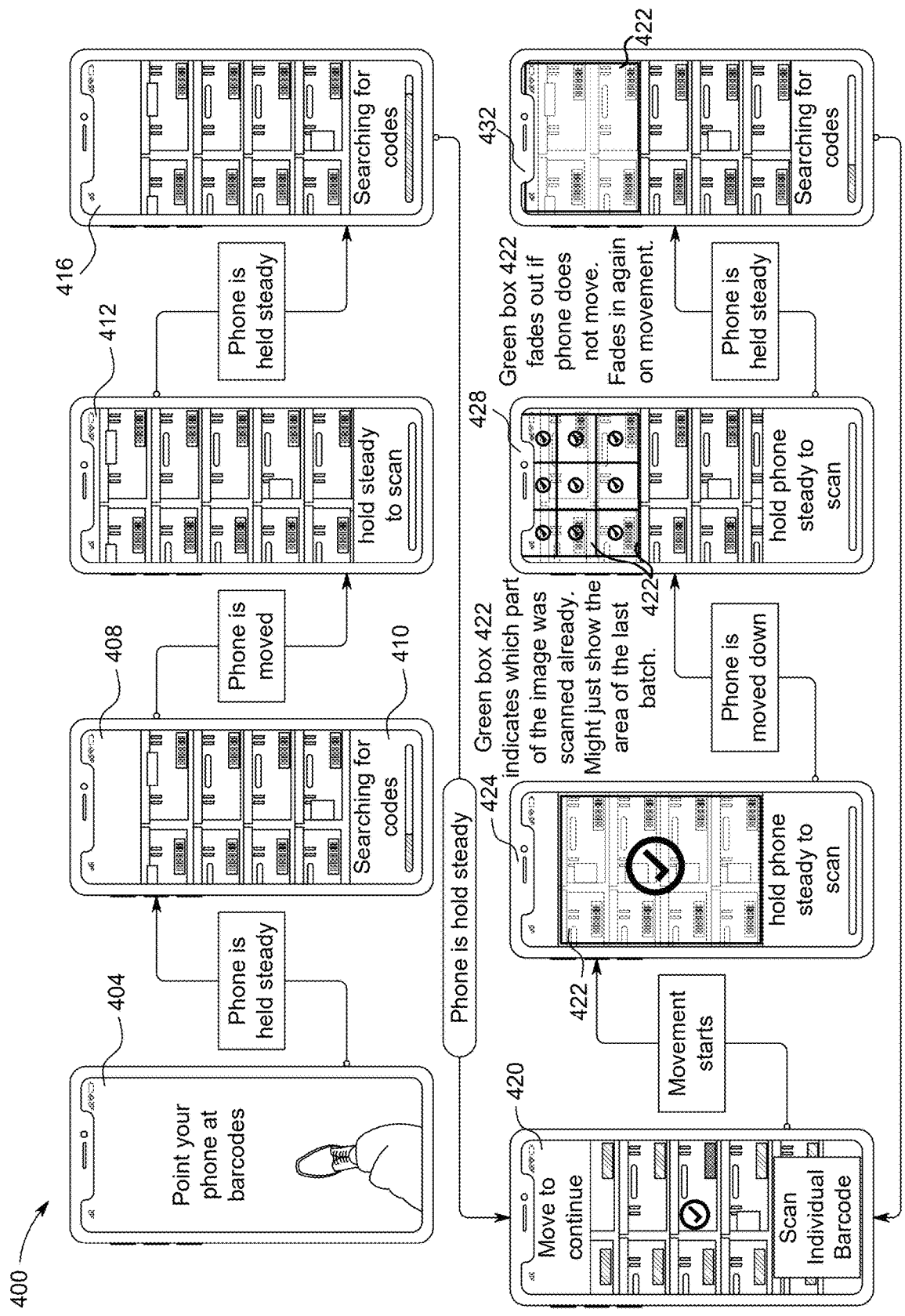
FIG. 4 depicts a second example the workflow for detecting multiple optical patterns in a scene.

FIG. 4 depicts a second example of implementing workflow 200 from FIG. 2 for detecting multiple optical patterns in a scene. Process 400 begins in step 404. In step 404, an application on a mobile device is started and the user is instructed to point a camera of the mobile device toward optical patterns. In step 408, the user points the camera toward a scene comprising optical patterns. The system ascertains that the mobile device is being held steady and begins to scan for optical patterns. The user is shown a progress bar 410 for scanning for optical patterns. In step 412, the mobile device is moved before scanning was completed in step 408, and the user is instructed to hold the mobile device steady. In step 416, scanning for optical patterns is performed while the mobile device is held steady.

Visualization in Scanned Areas

In step 420, the user is presented with the results of the scan (e.g., green rectangles overlaid on locations of decoded barcodes). After the user moves the mobile device, a green box 422 is placed over an area indicating that barcodes in that area have been scanned, step 424. The green box 422 continues to grow as the mobile device scans more areas. In some embodiments, a different shape than a box is used. Applicant has found that some users might lose time if only green dots or rectangles are shown on each individual optical pattern that is decoded (e.g., users may go back to areas previously scanned to review an area to ensure a barcode was not missed). The green box, dots, and/or rectangles are augmented-reality graphics presented on the display as an overlay of the scene to indicate to the user scanning progress. Positions of codes can be tracked, even when the codes are outside of the preview of the camera (e.g., by using visual odometry).

Step 428 shows a grid to confirm to a user a scanned area. In some embodiments, a grid is used as an intuitive way to indicate to a user the previously scanned areas (e.g., instead of the green box, or polygon, taking on an unusual shape, which could be confusing to some users). In some embodiments, areas of the scene that are scanned are lightened or darkened.

Step 432 shows the green box/area fades out if the phone does not move and fades in again on movement. In some embodiments, if scanned optical patterns presented go out of view, it is assumed the intention is to continue to scan (though positions of codes can be tracked even though the codes are out of the field of view of the camera). In some embodiments, a quadrant or line is used to distinguish a scanned area from an unscanned area.

Figure 5:
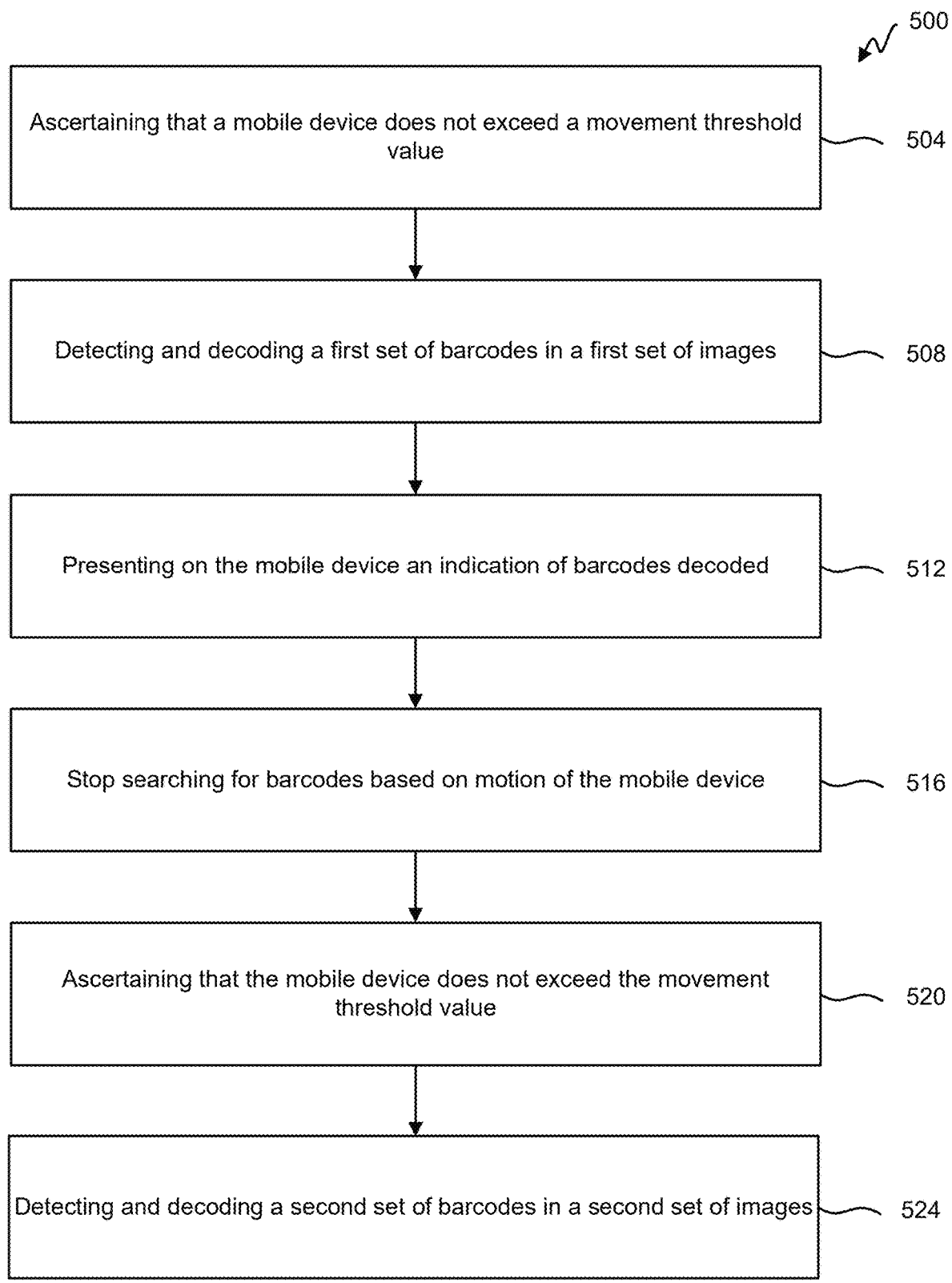
FIG. 5 illustrates a flowchart of an embodiment of a process for a workflow of detecting multiple optical patterns in a scene.

FIG. 5 illustrates a flowchart of an embodiment of a process 500 for a workflow for detecting multiple optical patterns in a scene. Process 500 begins in step 504 with ascertaining that a mobile device does not exceed a movement threshold value. Detecting motion of the mobile device can be performed using non-optical (e.g., accelerometers, inertial measurement units) and/or optical sensors (e.g., image analysis to detect motion blur).

In step 508, a first set of barcodes in a first set of images are detected and decoded. The first set of images are acquired using a camera of the mobile device. The first set of images are scanned to detect and decode the first set of barcodes. For example, an algorithm for detecting and/or decoding barcodes is run on the first set of images. In some embodiments, the algorithm for detecting and/or decoding barcodes also tracks barcodes within the preview of the camera.

In step 512, an indication of barcodes decoded is presented on the mobile device. The indication can be an augmented reality overlay, based on tracking the first set of barcodes within a preview of the camera. As mentioned in the description of FIGS. 3 and 4, indication can individually indicate barcodes that are successfully decoded and/or indication can indicate areas that have completed barcode scanning.

In step 516, scanning for barcodes is stopped, based on motion of the mobile device. For example, motion of the mobile device could exceed a threshold for motion for performing barcode scanning.

In step 520, motion of the mobile device is ascertained to not exceed the movement threshold value, after scanning for barcodes is stopped in step 516.

In step 524, a second set of barcodes is detected and decoded in a second set of images. The second set of images are acquired using the camera of the mobile device. The second set of barcodes can be tracked, and/or an indication of the second set of barcodes decoded can be presented to the user. For example, an area of successful barcode decoding can extend from the first set of barcodes to the second set of barcodes.

B. Mapping of Barcodes Using Visual Odometry

A homographic transform, sometimes referred to as a homography, defines a transformation between two views of a scene. The homographic transform between two images can be calculated from a set of feature correspondences (e.g., positions of point observations in a camera image space) between the views. Visual cues can be detected and tracked (e.g., optical flow) over multiple frames to establish point-wise correspondences between the views and then solve for the homographic transformation.

Figure 6:
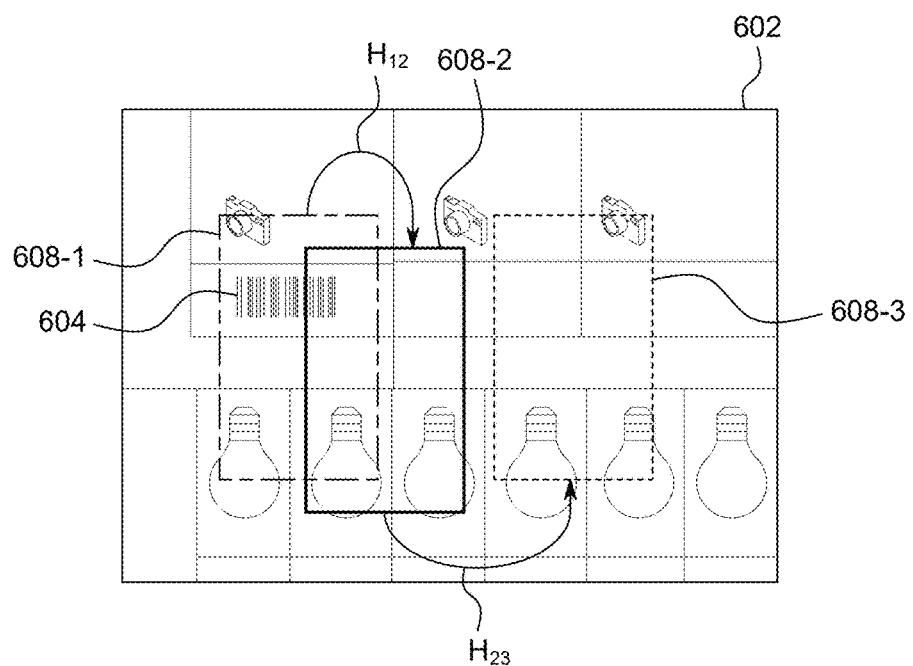
FIG. 6 illustrates a mobile device position in an embodiment of using visual odometry during optical pattern scanning.

FIG. 6 illustrates positions of a mobile device in relation to a scene 602 in an embodiment of using visual odometry during optical pattern scanning. FIG. 6 depicts the scene 602, an optical pattern 604 (e.g., a barcode) within the scene 602, a first frame 608-1 of the scene acquired by a camera of a mobile device at a first position; a second frame 608-2 of the scene acquired by the camera of the mobile device at a second position; and a third frame 608-3 of the scene acquired by the camera of the mobile device at a third position. A first homograpy $H_{12}$ is a transformation from the first frame 608-1 to the second frame 608-2. A second homography $H_{23}$ is a transformation from the second frame 608-2 to the third frame 608-3. In some embodiments, intermediate transformations (e.g., intermediate homographies with overlapping features) are used in frames between the second frame 608-2 and the third frame 608-3 to calculate the second homography $H_{23}$.

Figure 7:
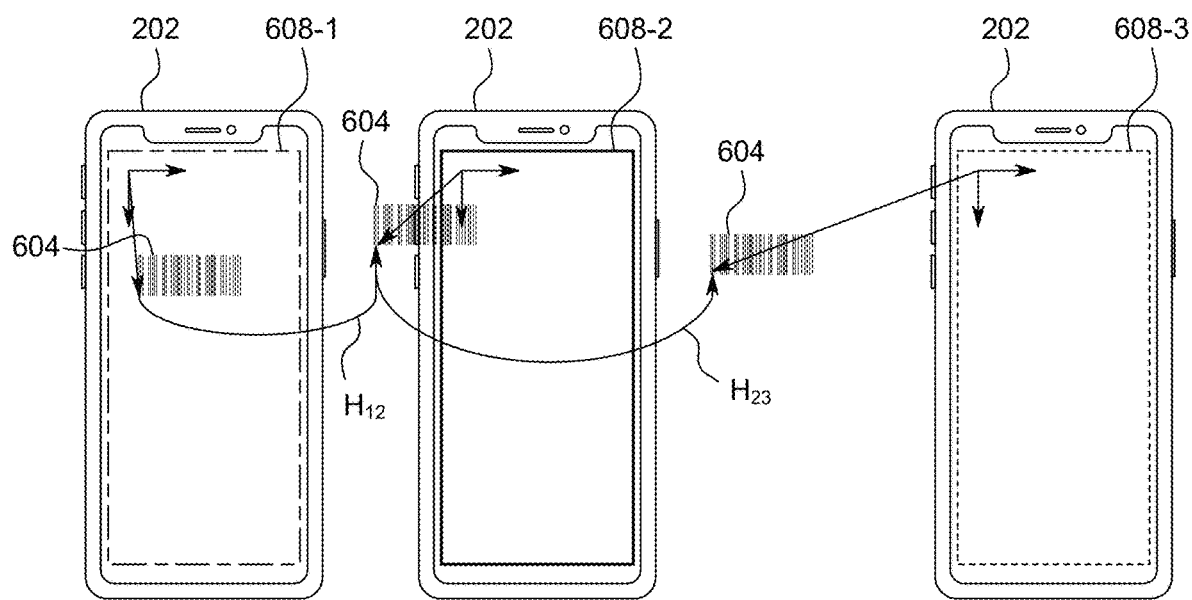
FIG. 7 illustrates an optical pattern in relation to a mobile device using visual odometry during optical pattern scanning.

FIG. 7 illustrates the optical pattern 604 in relation to a frame 608 of a mobile device 202, while using visual odometry during optical pattern scanning. The mobile device 202 comprises a camera used to acquire frames 608 (e.g., images). The mobile device 202 is a hand-held, mobile device (e.g., a smartphone or a tablet). In some embodiments, processing is performed on the mobile device 202 and/or using a remote device (e.g., on a remote server by transmitting image data from frames 608 to the remote server).

FIG. 6 and FIG. 7 depict tracking an object (e.g., optical pattern 604) in a quasi-planar scene. Inter-frame homographies H are used to predict the position of the object (e.g., a scanned optical pattern) in relation to a coordinate system of the frame 608. Similar principles can be used to visualize other augmentations (e.g., to highlight a part of the scene that has already been analyzed). A position of a point in subsequent views is derived by applying inter-frame transformations (e.g., homographies).

Three-dimensional tracking can be computationally intense (e.g., calculating three-dimensional homographies can be computationally intense). To reduce computation (e.g., so that calculations can be made more efficiently and/or quickly on a mobile device), one or more assumptions are used to simplify tracking calculations, in some embodiments. One assumption is that the scene is almost planar, or that the optical patterns in the scene are almost planar. Another assumption is that movement of the mobile device is almost parallel to the scene, which can reduce parallax effects in images of the scene. Tracking can enable marking an optical pattern as scanned, even though the preview of the mobile device leaves the optical pattern and then returns later to the optical pattern.

In some configurations, pixel tracking and/or frame-to-frame camera transformations are used. For example, in two adjacent frames (e.g., from the first frame 608-1 to the second frame 608-2), a transformation (e.g., $H_{12}$) is calculated, image features are detected in frames (e.g., for optical flow) to map features, and/or image points are tracked from one frame to another. In some embodiments, intrinsics of the camera (e.g., lens focal length, lens geometric distortion, pixel size of the sensor) are not used (e.g., because triangulation is not used). In some configurations, real-world scale is not used; points are kept track of in pixel coordinates of a preview of the camera.

In FIGS. 6 and 7, the second frame 608-2 is moved down and to the right compared to the first frame 608.1. Thus, the position of the optical pattern 604 relative to the camera is moved up and to the left by a corresponding number of pixels. The system can track features outside of the preview (e.g., outside of the frame 608) using expanded pixel and/or negative pixel coordinates. For example, the optical pattern 604 can still be referenced in pixels from the third frame 608-3, even though the optical pattern 604 is not within the preview of the third frame 608-3. Thus features (e.g., optical patterns and/or locations for AR graphics) outside of the preview frame 608 can be efficiently tracked. Calculating inter-frame homographies can be considered visual odometry, e.g., the process of determining the camera pose (in our case not with 6 degrees of freedom) by analyzing a sequence of images. In some embodiments, images are segmented to obtain a planar surface having optical patterns. In some embodiments, two or more optical patterns 604 are tracked between frames 608.

In some situations, a user does not backtrack significantly while scanning optical patterns, so drift is not a high concern. In some situations, it can be helpful to re-localize the map (e.g., to correct for drift). For example, re-localization could be used after a user corrects a missed scan or has a large shift in orientation (e.g., the user points the camera of the mobile device 202 toward the ground while entering text). Key frames can be used for orientation of the camera with the scene (e.g., re-localization). A key frame is a view that was classified as being visually distinct. In some embodiments, a key frame includes an image of one, two, or more unique barcodes.

Figure 8:
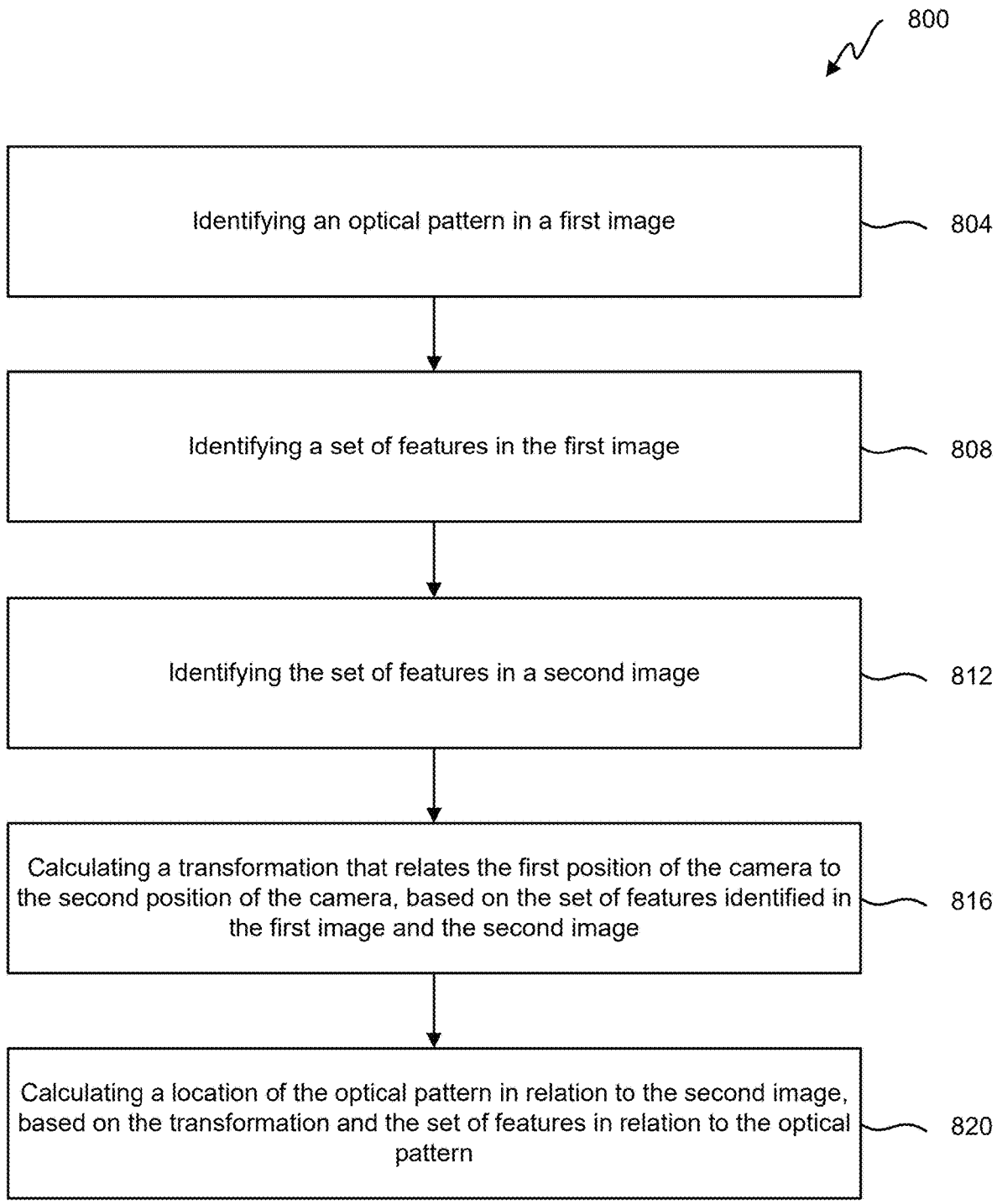
FIG. 8 illustrates a flowchart of an embodiment of a process for using visual odometry during optical pattern scanning.

FIG. 8 illustrates a flowchart of an embodiment of a process 800 for using visual odometry during optical pattern scanning. Process 800 begins in step 804 with identifying an optical pattern in a first image. A first image of a scene is acquired by a camera. The first image is acquired by the camera while the camera is at a first position. For example, the first frame 608-1 is acquired of the scene 602 in FIG. 6. The optical pattern (e.g., optical pattern 604 in FIG. 6) is identified in the first image. In some embodiments, the optical pattern is identified and decoded using the first image. The first image is received by a mobile device (e.g., a mobile device comprising the camera) and/or a device remote from the mobile device. A set of features in the first image are identified in relation to the optical pattern, step 808.

In step 812, the set of features is identified in a second image of the scene. The second image is acquired by the camera, while the camera is at a second position. For example, the second frame 608-2 is acquired of the scene 602 in FIG. 6. The second image is received by the mobile device and/or the device remote from the mobile device.

In step 816, a transformation is calculated that relates the first position of the camera to the second position of the camera, based on the set of features identified in the first image and the second image. For example, homography $H_{12}$ in FIG. 6 is calculated relating the position of the second frame 608-2 to the position of the first frame 608-1.

In step 820, a location of the optical pattern is calculated in relation to the second image, based on the transformation and the set of features in relation to the optical pattern. For example, a position of the optical pattern 604 is calculated in relation to the second frame 608-2, as shown in FIG. 7. In another example, the position of the optical pattern 604 is calculated in relation to the third frame 608-3, as shown in FIG. 7 (e.g., based on overlap of a second set of features in the third frame 608-3 and a previous frame, in addition to knowing the relation of the optical pattern to the previous frame).

In some embodiments, calculating the transformation assumes that the camera moves in a plane parallel with the scene. For example, the mobile device 202 moves in a plane parallel to the scene 602 and FIG. 6. In some embodiments, there is no or little relative tilt (e.g., equal or less than 2, 5, 10, 15, 20, 25, or 30 degrees of tilt) of the camera between frames 608, and/or the calculating the transformation assumes there is no tilt.

A location of the optical pattern in relation to the second image can be measured in pixels of the camera and/or the transformation is calculated without using intrinsic data about the camera. For example, calculations are made with respect to the camera sensor, or image, instead of to a real-world frame or scale of the scene 602. The optical pattern 604 is not fully within the second frame 608-2 of FIG. 7, and the position of the optical pattern 604 is still calculated with respect to the second frame 608-2 (e.g., even though the optical pattern cannot be identified and/or decoded in the second frame 608-2, the position of the optical pattern 604 is calculated with respect to the second frame 608-2). And even though no portion of the optical pattern 604 in FIG. 7 is within the third frame 608-3, the position of the optical pattern 604 can be calculated with respect to the third frame 608-3.

In some embodiments, features withing the set of features are estimated to be on a plane for calculating the transformation. In some embodiments, the process further comprises segmenting the second image into foreground and background segments, before identifying the set of features in the second image, and/or identifying the set of features in the foreground segment of the second image. For example, commonly owned U.S. patent application Ser. No. 17/385,604, filed on Jul. 26, 2021, which is incorporated by reference for all purposes, describes a technique for segmenting an image with barcodes.

In some embodiments, the set of features is a first set of features, the transformation is a first transformation, and/or the process further comprises: receiving a third image acquired by the camera, wherein the third image is acquired by the camera while the camera is at a third position; calculating a second transformation that relates the second position of the camera to the third position of the camera, based on a second set of features identified in both the second image and the third image; and calculating a location of the optical pattern in relation to the third image, based on the second transformation. For example, the optical pattern 604 is calculated in relation to the third frame 608-3 in FIG. 7 based on the homography $H_{23}$.

C. Automatic Detection of Missing Optical Patterns

Missing optical patterns can be automatically detected using tracking and/or visual odometry.

Figure 9:
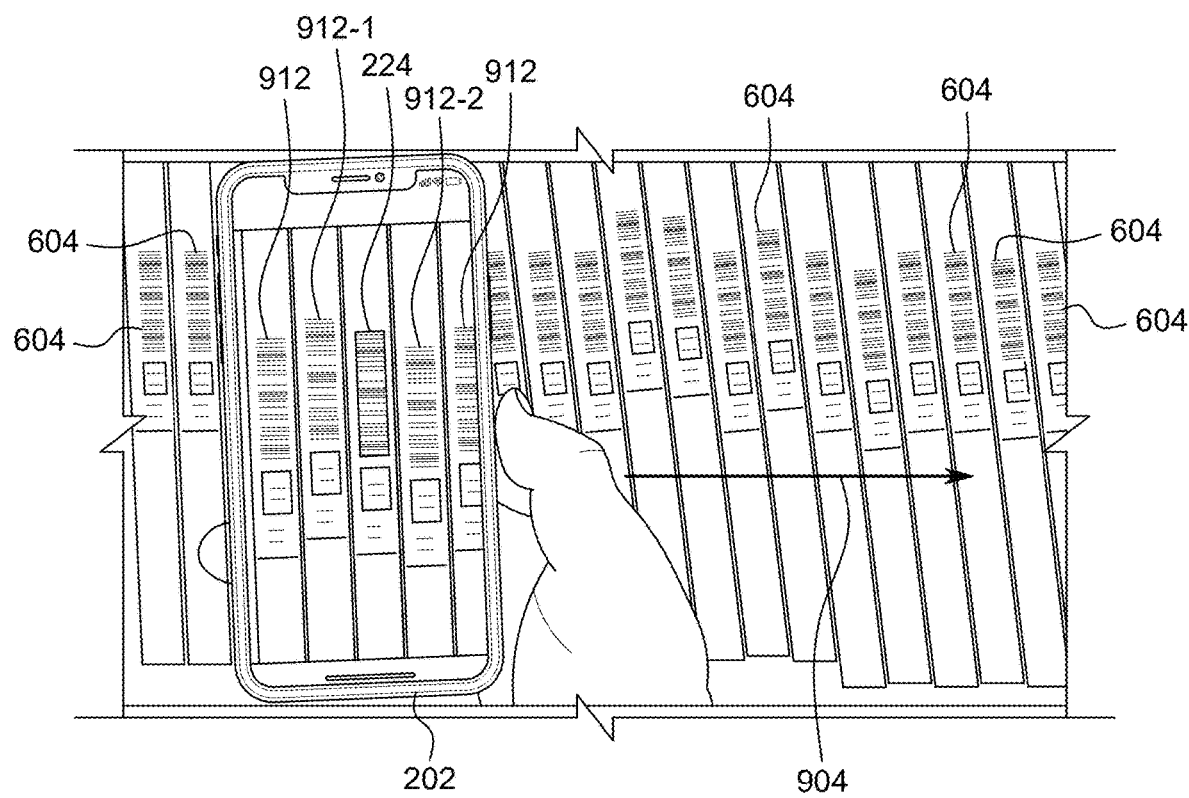
FIG. 9 illustrates an embodiment of swipe scanning.

FIG. 9 illustrates an embodiment of swipe scanning. As shown in FIG. 9, a mobile device 202 is used to detect and decode a plurality of optical patterns 604 in a line. The optical patterns 604 are attached to a plurality of blinders. The mobile device 202 is moved in one direction 904. Swipe scanning can use optical pattern tracking and/or visual odometry. An example of optical pattern tracking is given in U.S. Pat. No. 10,963,658, granted on Mar. 30, 2021, which is incorporated by reference for all purposes.

By limiting motion to one direction, calculations can be further simplified. In the embodiment shown in FIG. 9, transformation calculations assume the camera moves in one dimension only.

The optical patterns 604 are arranged in a periodic order. For example, each binder has about the same width. The periodic nature of the barcodes can be used to detect if a barcode is missing. For example, the system can predict the barcode 908 is missing and/or unreadable based on detecting positions of barcodes 912 and ascertaining that there is a gap between a first barcode 912-1 and a second barcode 912-2 that is larger than distances between other barcodes.

Figure 10:
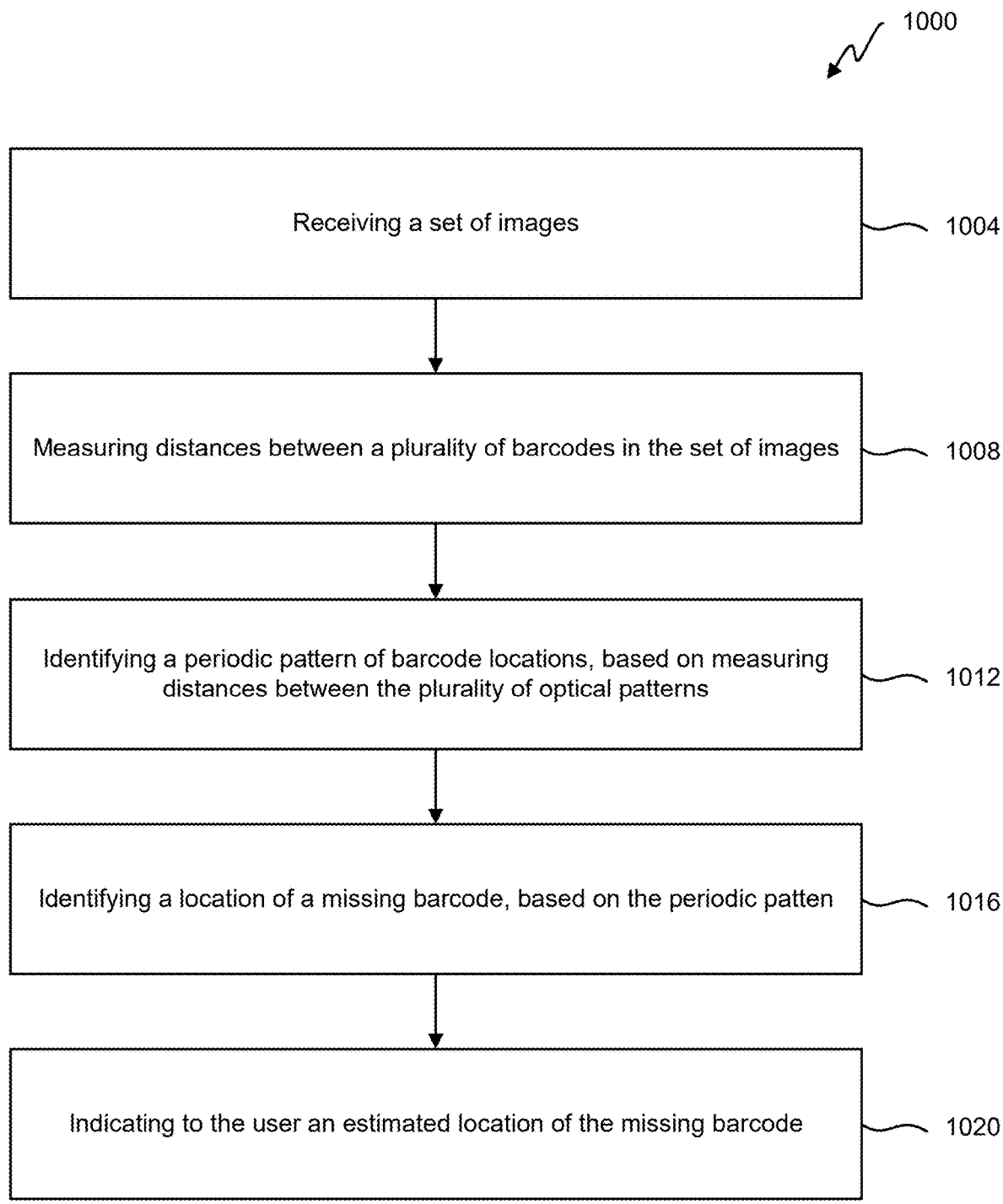
FIG. 10 illustrates a flowchart of an embodiment of a process for automatic detection of a missing barcode.

FIG. 10 illustrates a flowchart of an embodiment of a process 1000 for automatic detection of a missing optical pattern. Process 1000 begins in step 1004 with receiving a set of images. The set of images are acquired while the camara is held at one position or multiple positions. The first set images comprise a plurality of barcodes (or other optical patterns). In some embodiments, the set of images is one image or more than one image.

In step 1008, distances between the plurality barcodes are measured. A periodic pattern of barcode locations is identified, based on measuring distances between the plurality of barcodes, step 1012. A location of a missing barcode is identified, based on the periodic pattern, step 1016. An indication of the location of the missing barcode is presented to the user. For example, the indication of the location of the missing barcode is an augmented-reality overlay on the screen of the mobile device. In some embodiments, distances are relative distances (e.g., pixels) and/or optical patterns are assumed to be on a plane. In some embodiments, a map of the locations of the plurality of barcodes is generated, and/or distances between barcodes are measured using the map. In some embodiments, the periodic structure is two dimensional (e.g., as shown in FIG. 11).

D. Counting Non-Serialized Barcodes

In some embodiments, non-serialized barcodes (or other optical patterns) can be challenging to count. For example, if barcodes are counted based on decoding a barcode, then multiple non-serialized barcodes can be counted as one barcode. To count non-serialized barcodes, barcodes are mapped using tracking (e.g., within a preview of a camera) and/or using visual odometry (e.g., to track barcodes outside the preview area of the camera).

Figure 11:
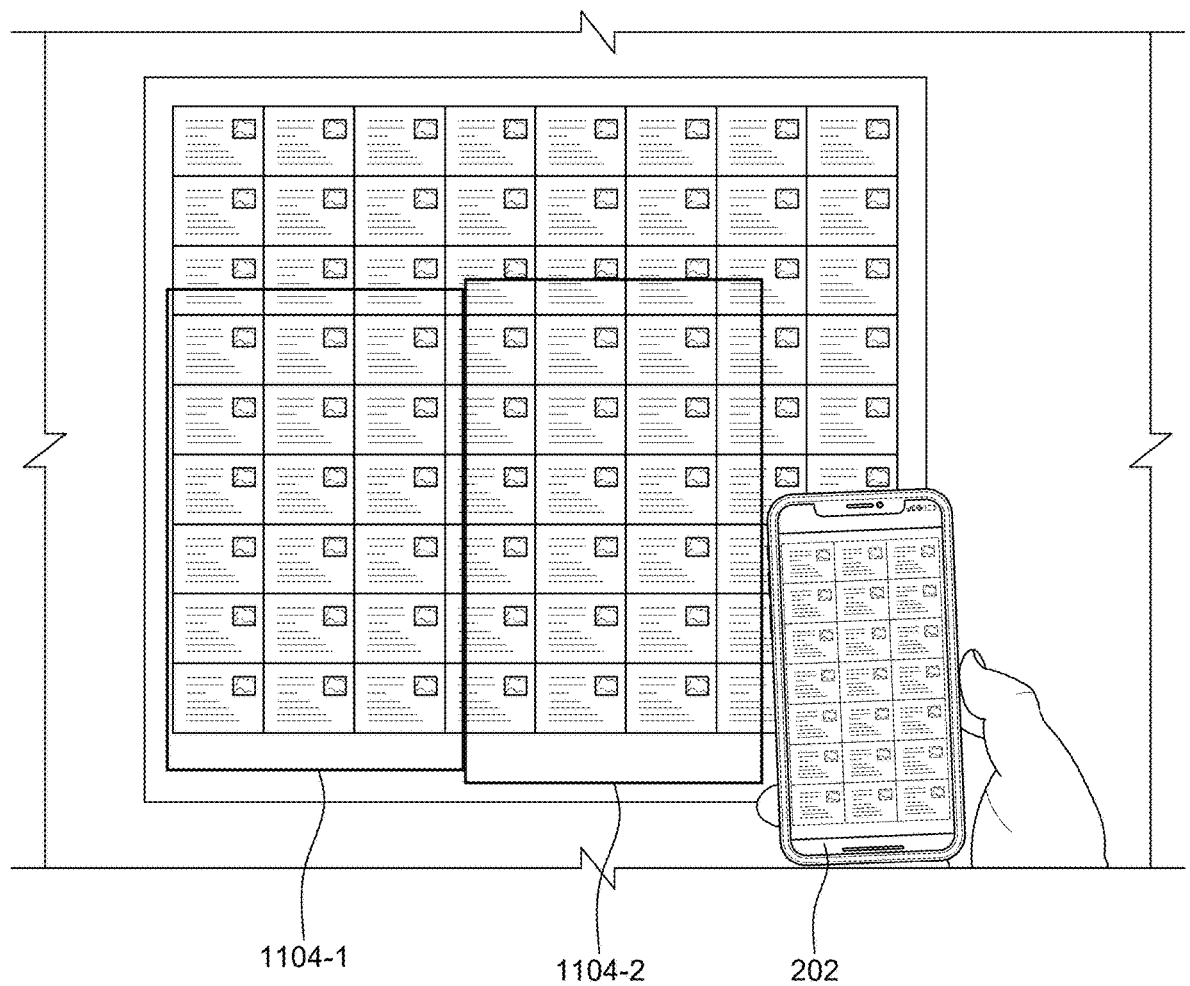
FIG. 11 illustrates an embodiment of batch scanning.

FIG. 11 illustrates an embodiment of batch scanning and counting non-serialized barcodes. FIG. 11 depicts a first batch 1104-1 and a second batch 1104-2 of scanned barcodes, scanned by a mobile device 202.

Figure 12:
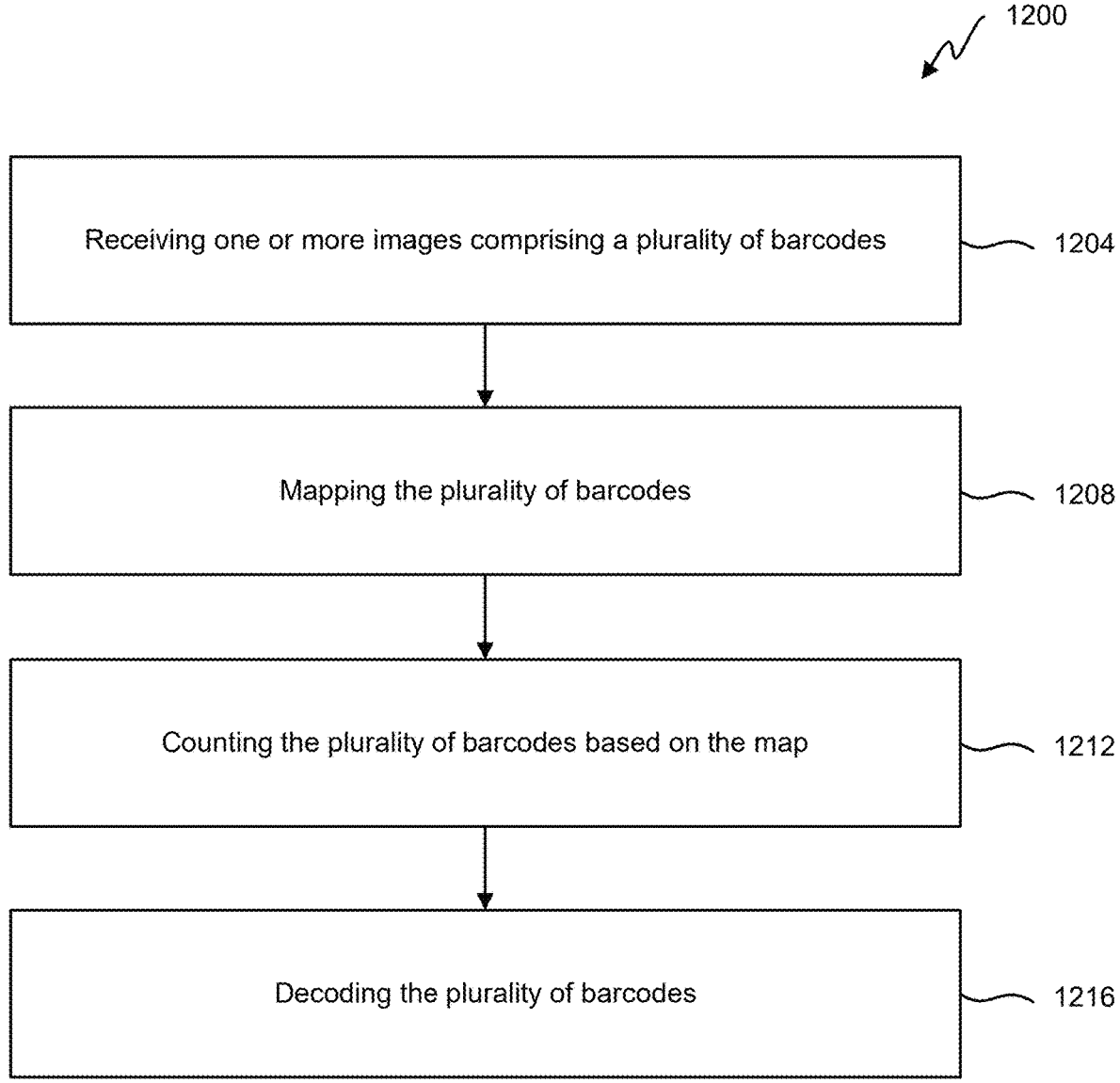
FIG. 12 illustrates a flowchart of an embodiment of a process for counting non-serialized optical patterns.

FIG. 12 illustrates a flowchart of an embodiment of a process 1200 for counting non-serialized optical patterns. Process 1200 begins in step 1204 with receiving one or more images comprising a plurality of barcodes. At least two of the plurality of barcodes are non-serialized, such that the at least two barcodes are non-distinguishable from each other, based on optical analysis of the barcodes. In step 1208, the plurality of barcodes are mapped. For example, the plurality of barcodes can be mapped using barcode tracking and/or visual odometry. In step 1212, the plurality of barcodes are counted using the map. In step 1216, the plurality of barcodes are decoded. In some embodiments, the map comprises nodes (e.g., locations of barcodes) and lines connecting the nodes, where the lines each represent a distance between nodes (e.g., wherein the lines are measured in number of pixels).

An indication to the user can be presented on a barcode, or the plurality of barcodes, that have been counted and/or decoded. In some embodiments, barcodes arranged in a periodic, or known, fashion can be used to identify a missing barcode. In some embodiments, each of the plurality of barcodes is not decoded (e.g., just counted).

Multiple Focal Distances

To increase a number of barcodes detected, multiple focal distances of the camera can be used. For example, multiple images are acquired of each batch 1104 in FIG. 11, and the multiple images are acquired using a different focal setting of the camera. Thus each batch is imaged multiple times.

In certain scenarios, barcodes that are farther from the camera are not decoded, due to the camera being focused on an orthogonal plane that is usually on the closest barcodes. To detect and/or decode more barcodes, the focal length of the camera can be changed on the fly to increase the number of barcodes scanned. For example, images of a scene can be captured using [f−D, f, f+D] in a case of three different focal lengths, wherein f is one focal length and D is a fixed interval.

In some embodiments, an adaptive focal distance is used (e.g., instead of the fixed interval D). For an adaptive focal distance, a parameter other than a fixed interval is used. For example, areas of high contrast in an image could be identified, and focal distances to bring the areas of high contrast into focus could be used to try to detect and/or decode more barcodes within a batch.

In some embodiments, a process further comprises receiving a plurality of images acquired by the camera, wherein the camera acquires the plurality of images while the camera is at a first position. Each of the plurality of images is acquired using a different focal distance setting of the camera. A second optical pattern is detected and/or decoded in one of the plurality of images. A location of the second optical pattern is calculated in relation to the second image, based on a transformation.

Drift Correction

While calculating camera pose (e.g., absolute pose in relation to an origin) as a cumulative transformation between adjacent frames, small errors can sum up and result in a visual offset between the physical world and the projected overlays (e.g., also known as drift).

In some embodiments, to reduce drift, camera pose (the camera pose relative to a coordinate frame where an AR overlay was initialized) is established as a sum of transformations between keyframes (e.g., instead of a sum of transformations between each frame of a video stream).

A keyframe is a single frame from a video stream that was identified or selected by the application because the frame is visually particularly discriminant. For example, a keyframe can be captured during scanning (e.g., step 112 in FIG. 1 while barcodes are scanned); during presentation (e.g., step 116 in FIG. 1); and/or when a significant change is detected in the view (e.g., in terms of motion or in terms of change in a higher order description of the scene, such as sparse feature points or a dense correlation measures). In some embodiments, a keyframe is defined by feature descriptors (e.g., points of interest) that can be visually identified.

During runtime, the application builds a graph where nodes relate to the keyframes and edges relate to the relative transformation between keyframes. A weight/confidence value can be assigned to each edge (e.g., to a transformation between two keyframes) according to how strong the correlation between two keyframes is. A "best" cumulative transform from an origin frame to the current frame is then established (e.g., continuously) as a path between keyframes that leads to a best overall score (which is a function of the edge weightings of the connection from the origin frame to the current frame).

The scoring between two keyframes may be calculated as a measure of a correlation between the feature descriptors of points of interest in both keyframes and/or by means of a neural network. For example, a score can be stablished based on a feature matching and/or by a neural embedding. In some configurations, learning-based approaches have shown to be more robust for such tasks since they are also able to reason about the underlying 3D scene during feature assignment.

Re-localization. During a re-localization phase (e.g., step 124 in FIG. 1), the camera pose (e.g., absolute camera pose based on a transformation relative to the origin frame) can be re-established through detection markers that are unique to the scene (e.g. barcodes) and/or by means of a keyframe graph described above. The edges of the keyframe graph can be re-weighted according to the position of the camera where tracking was lost. A combination of both approaches is also possible.

Scene change detection. If the user moves on to a different setup and tracking is lost, the application can automatically fall back into a re-localization mode where the observed scene is correlated to the keyframe graph. If no correlation is found, a new graph is initialized. Inertial measurement unit (IMU) measurements may be used in addition to visual cues of a scene change. The old graph can still persist and may serve for visual reconstructions of a scanned scene (e.g., a panoramic view where the locations of scanned locations, or locations where barcodes were suspected that couldn't be decoded, are indicated).

Figure 13A:
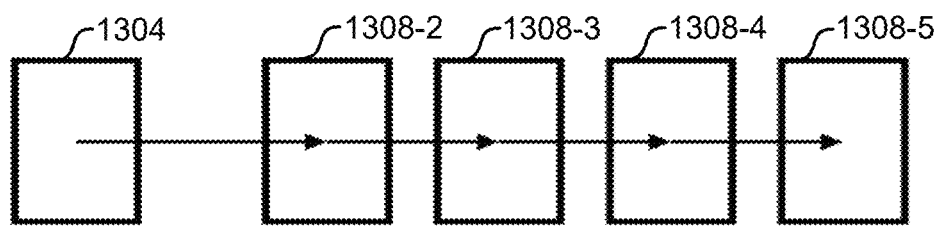
FIG. 13a depicts an embodiment of accumulative transformation calculation.

FIG. 13a depicts an embodiment of accumulative transformation calculation. Transformation calculation begins with acquiring an origin frame 1304. Transformations are calculated based on the origin frame 1304, a second frame 1308-2, a third frame 1308-3, a fourth frame 1308-4, a fifth frame 1308-5, and so on. For example, frames 1308 are sequential frames of a video feed for a camera preview on a mobile device.

Figure 13B:
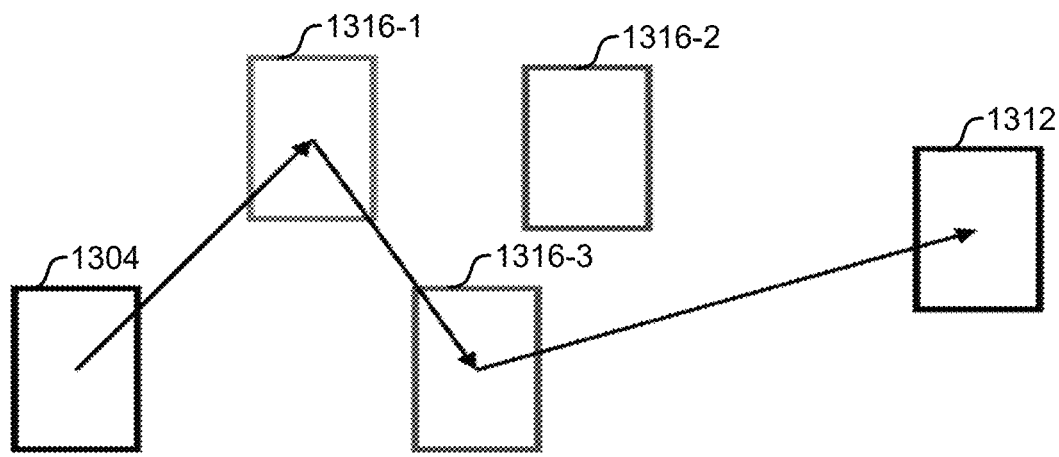
FIG. 13b depicts an embodiment of keyframe-based transformation.

FIG. 13b depicts an embodiment of keyframe-based transformation. FIG. 13b shows an origin frame 1304, a current frame 1312, a first keyframe 1316-1, a second keyframe 1316-2, and a third keyframe 1316-3. The third keyframe 1316-3 is acquired after the second keyframe 1316-2, and the second keyframe 1316-2 is acquired after the first keyframe 1316-1. Calculation of the transformation of the current frame 1312 is based on a transformation from the origin frame 1304 to the first keyframe 1316-1, from the first keyframe 1316-1 to the third keyframe 1316-3, and from the third keyframe 1316-3 to the current frame 1312, and not through the second keyframe 1316-2. For example, the path through the third keyframe 1316-3 and not through the second keyframe 1316-2 could have a higher overall score, as discussed above.

In some embodiments, keyframes 1316 are non-consecutive images from a video feed. For example, keyframes 1316 are selected from a video feed equal to or less than one keyframe 1316 per 0.3, 0.5, 1, 1.5, or 2 seconds and/or equal to or greater than one keyframe 1316 per 1, 2, 5, or 10 seconds. Considering that a video feed can acquire image frames at 30 frames per second, or faster, keyframes 1316 are selected at a slower rate than images of the video are acquired.

Figure 14:
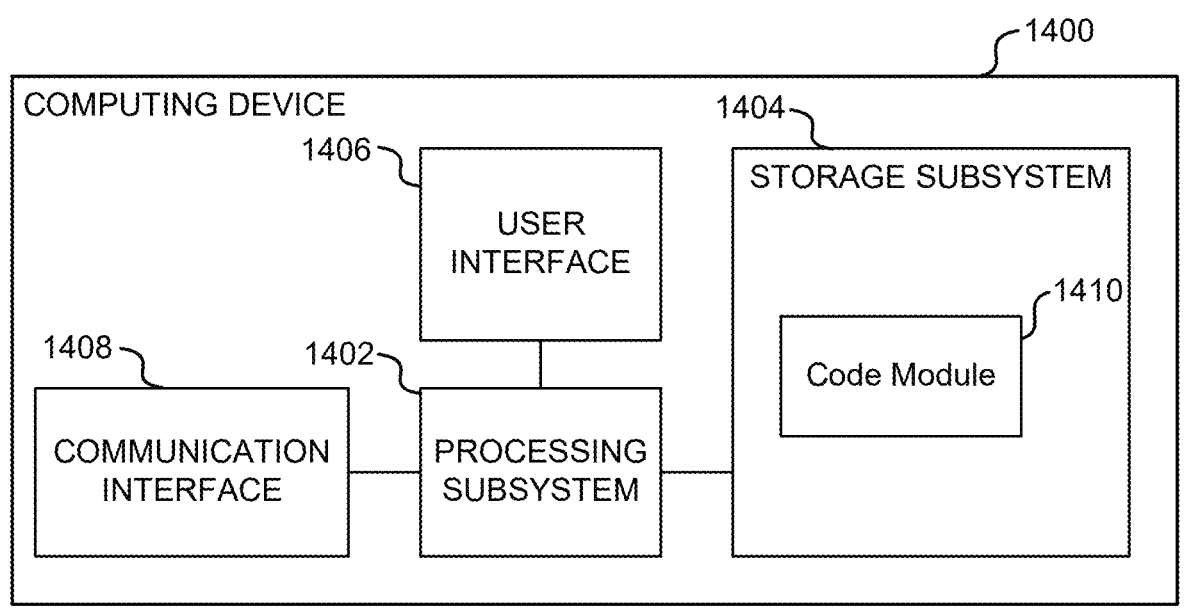
FIG. 14 depicts a block diagram of an embodiment of a computer system.

FIG. 14 is a simplified block diagram of a computing device 1400. Computing device 1400 can implement some or all functions, behaviors, and/or capabilities described above that would use electronic storage or processing, as well as other functions, behaviors, or capabilities not expressly described. Computing device 1400 includes a processing subsystem 1402, a storage subsystem 1404, a user interface 1406, and/or a communication interface 1408. Computing device 1400 can also include other components (not explicitly shown) such as a battery, power controllers, and other components operable to provide various enhanced capabilities. In various embodiments, computing device 1400 can be implemented in a desktop or laptop computer, mobile device (e.g., tablet computer, smartphone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1404 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1404 can store one or more applications and/or operating system programs to be executed by processing subsystem 1402, including programs to implement some or all operations described above that would be performed using a computer. For example, storage subsystem 1404 can store one or more code modules 1410 for implementing one or more method steps described above.

A firmware and/or software implementation may be implemented with modules (e.g., procedures, functions, and so on). A machine-readable medium tangibly embodying instructions may be used in implementing methodologies described herein. Code modules 1410 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1410) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1410 may comprise sets of instructions (codes) embodied on a computer-readable medium that directs a processor of a computing device 1400 to perform corresponding actions. The instructions may be configured to run in sequential order, in parallel (such as under different processing threads), or in a combination thereof. After loading a code module 1410 on a general purpose computer system, the general purpose computer is transformed into a special purpose computer system.

Computer programs incorporating various features described herein (e.g., in one or more code modules 1410) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1404 can also store information useful for establishing network connections using the communication interface 1408.

User interface 1406 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1406 to invoke the functionality of computing device 1400 and can view and/or hear output from computing device 1400 via output devices of user interface 1406. For some embodiments, the user interface 1406 might not be present (e.g., for a process using an ASIC).

Processing subsystem 1402 can be implemented as one or more processors (e.g., integrated circuits, one or more single-core or multi-core microprocessors, microcontrollers, central processing unit, graphics processing unit, etc.). In operation, processing subsystem 1402 can control the operation of computing device 1400. In some embodiments, processing subsystem 1402 can execute a variety of programs in response to program code and can maintain multiple concurrently executing programs or processes. At a given time, some or all of a program code to be executed can reside in processing subsystem 1402 and/or in storage media, such as storage subsystem 1404. Through programming, processing subsystem 1402 can provide various functionality for computing device 1400. Processing subsystem 1402 can also execute other programs to control other functions of computing device 1400, including programs that may be stored in storage subsystem 1404.

Communication interface 1408 can provide voice and/or data communication capability for computing device 1400. In some embodiments, communication interface 1408 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1408 can provide wired connectivity (e.g., universal serial bus, Ethernet, universal asynchronous receiver/transmitter, etc.) in addition to, or in lieu of, a wireless interface. Communication interface 1408 can be implemented using a combination of hardware (e.g., driver circuits, antennas, modulators/demodulators, encoders/decoders, and other analog and/or digital signal processing circuits) and software components. In some embodiments, communication interface 1408 can support multiple communication channels concurrently. In some embodiments the communication interface 1408 is not used.

It will be appreciated that computing device 1400 is illustrative and that variations and modifications are possible. A computing device can have various functionality not specifically described (e.g., voice communication via cellular telephone networks) and can include components appropriate to such functionality.

Further, while the computing device 1400 is described with reference to particular blocks, it is to be understood that these blocks are defined for convenience of description and are not intended to imply a particular physical arrangement of component parts. For example, the processing subsystem 1402, the storage subsystem, the user interface 1406, and/or the communication interface 1408 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 1400.

D. Counting Multiple Barcodes in a Single View with Adjustment Based on User Input In some embodiments, a system is configured to count multiple barcodes in a single view of a real scene. Accurate scanning and counting of multiple items at once via mobile devices (e.g., smartphones, tablets, etc.) is desired in industries such as retail, logistics, and parcel and post industries. By shifting tedious, repetitive tasks from frontline operators or workers to technology, errors in stock management or goods delivery can be reduced, minimized, or even eliminated, while people are freed up to engage in value-added activities. The techniques disclosed herein, in some embodiments, can boost human productivity, reduce human error, and/or maintain accurate stock levels, among other technical advantages. In some cases, operators or workers can speed up counting workflows by up to ten times. Among some aspects, real-time on-screen alerts via augmented reality (AR) can significantly reduce inaccuracies throughout the supply chain.

In some use cases, the barcodes to be scanned are identical. However, in some situations, the barcodes to be scanned can be divided into several types or categories, and barcodes in the same category are identical. A person having ordinary skill in the art will appreciate these variations and the general applicability of techniques disclosed herein.

By way of examples, below are some example use cases. The first example is stock-taking or cycle counts, where a worker scans products (all or partial) in a store, back-of-house, or warehouse at regular intervals to record stock levels. The second example is receiving, where a worker scans an incoming item or logistical unit, often against an order or receipt. The third example is van unloading, where a driver identifies items to be unloaded in a van, puts them on a hand trolley, and scans them before unloading the order. The fourth example is parcel inventory check, where pick up drop off (PUDO) workers scan parcels currently stored at their collection/delivery point to perform an inventory check.

Figure 15:
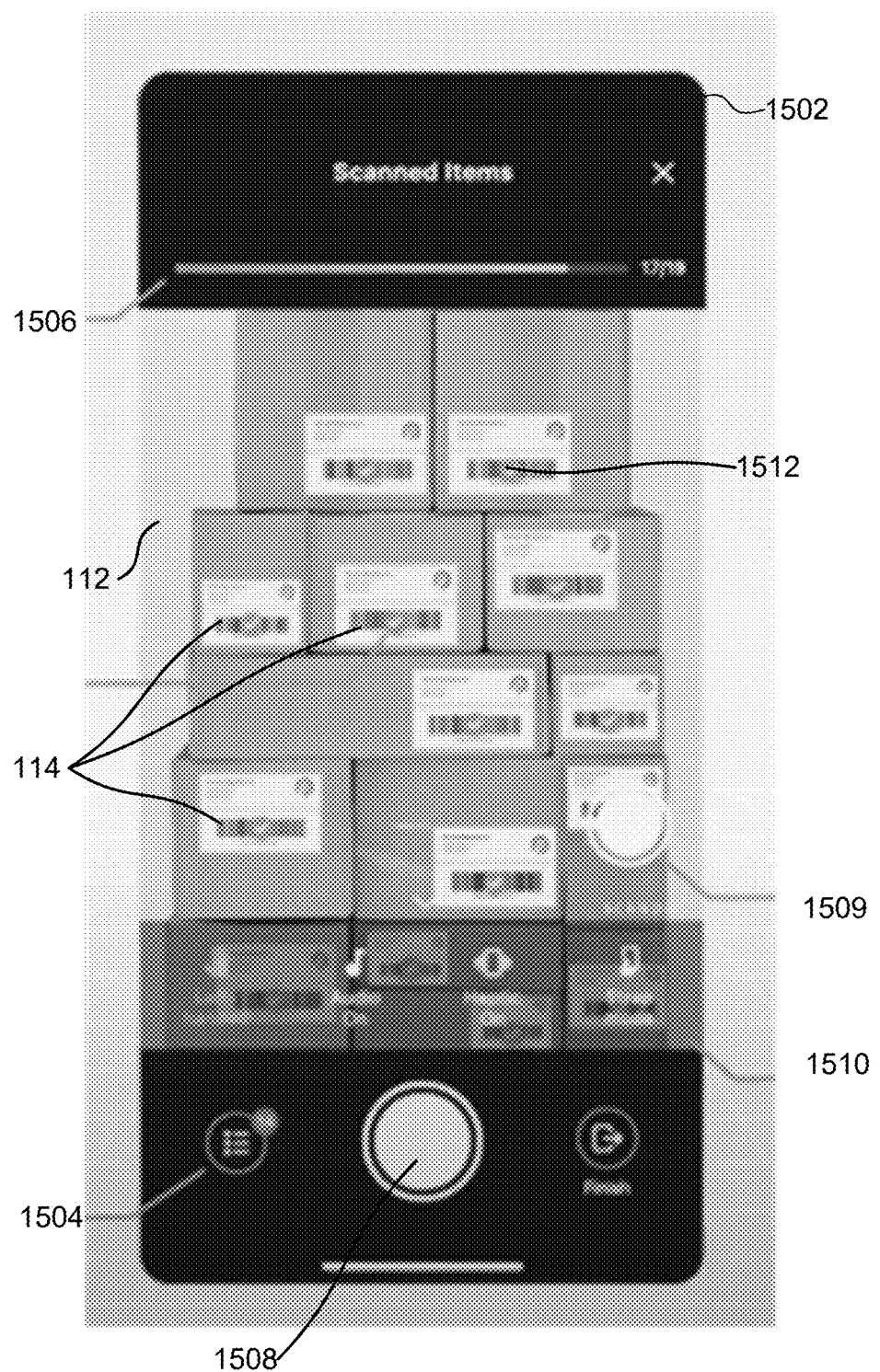
FIG. 15 is a diagram illustrating an example user interface of a mobile device in accordance with some embodiments.

FIG. 15 is a diagram illustrating an example user interface of a mobile device in accordance with some embodiments. As shown in FIG. 15, a user is holding a mobile device in front of a real scene (e.g., a scene of a warehouse). A camera of the mobile device has a field of view (FOV) of the real scene and is configured to capture an image 112 of the real scene for presentation on a display 1502 of the mobile device. In the example shown in FIG. 15, multiple items (e.g., packages to be delivered) are piled up, or stacked on top of each other, and each item has an optical pattern 114 (e.g., a barcode) on it. Optical patterns 114 are identical in some embodiments, and an operator is tasked to count a number of these items using the barcodes.

In some embodiments, a count list 1504 is presented on the display 1502 of the mobile device. The count list 1504 is shown as a button that, when pressed, provides more detailed information on a list of expected items (e.g., according to an order, a receipt, or a shipment). An example of the count list will be described below in greater detail with reference to FIG. 19. In some embodiments where a count list is not used, the button can be used to, when pressed, provide a list of scanned items. A red pop-up icon in, for example, the top-right corner indicates the real-time number of scanned barcodes in the current scan session. As the current scan session progresses, the real-time number increases gradually.

A progress bar 1506 is presented on the top of the display 1502. The progress bar 1506 is used when the user is scanning against a list of expected items. In such a situation, the progress bar 1506 shows how many expected barcodes have been scanned (i.e., detected and decoded) and/or how many expected items have been counted. In the example shown in FIG. 15, seventeen expected items have been counted out of nineteen expected items.

A scan button 1508 is presented on the display 1502. The scan button 1508 is used to trigger the scanning process. When the scan button 1508 is pressed, a new scanning process starts. The scan button 1508 is adjustable. For example, the scan button 1508 can be repositioned at a different location on the display 1502 to fit personal preferences of a user.

A settings toolbar 1510 is also presented on the display 1502. When the user presses the settings toolbar 1510, the user interface will provide the user with multiple settings, enabling the user to configure the scanning experience depending on the user's needs or preferences. For example, the user can turn on or turn off haptic alerts. As another example, the user can turn on or turn off audio alerts (e.g., different beep sound effects for successful decoding or failed decoding of the optical pattern 114). The user may also activate a left-handed mode, and locations of buttons may be flipped horizontally. In another example, the user may convert a color scheme of the user interface to color-blindness friendly. In another example, the user may activate a strap mode when using the mobile device with a strap, and an adjustable scan button 1509 may be placed at a comfortable position on the display 1502. It should be understood that other settings are within the contemplation of the disclosure.

For each optical pattern 114, such as a barcode, that has been successfully scanned (i.e., detected and decoded), an indication of a decoded barcode (e.g., in the form of an AR overlay 1512) is generated and presented on the display 1502. In the example shown in FIG. 15, the AR overlay 1512 is a (green or blue) checkmark, indicating the successful scanning. In some embodiments, another type of AR overlays (e.g., orange exclamation marks, like the one shown in FIG. 17B) are generated and presented on the display 1502 as an indication of unsuccessfully decoded barcodes (e.g., detected but not decoded). As such, the user can visualize the scanning progress in the image 112. In some embodiments, the image 112 is part of a video feed presented on the display 1502.

Figure 16:
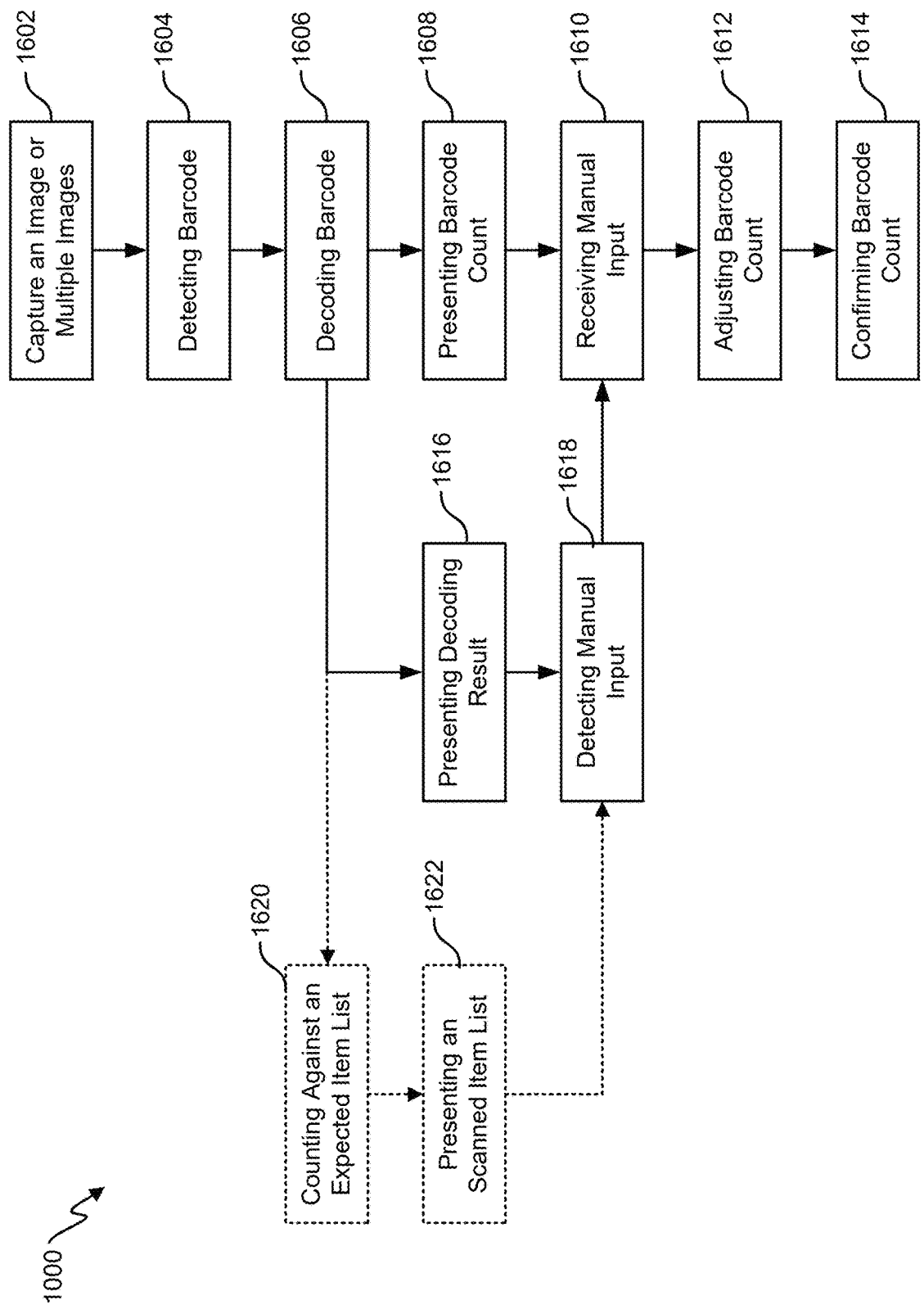
FIG. 16 is a diagram illustrating a workflow for counting barcodes in accordance with some embodiments.

FIG. 16 is a diagram illustrating a workflow 1600 for counting barcodes in accordance with some embodiments. The workflow 1600 is executed on a mobile device. The workflow 1600 begins at step 1602. An image (e.g., the image 112 shown in FIG. 15) is captured by a camera of the mobile device. In some embodiments, multiple images are captured by the camera of the mobile device. In some embodiments, a depth map of the scene is acquired by a ranging system using a laser such as a LiDAR system. At step 1604, the barcodes (e.g., barcodes shown in FIG. 15) in the image are detected. At step 1606, the detected barcodes are decoded. Details of scanning (i.e., detecting and decoding) barcodes are similar to those discussed above at step 212 in FIG. 2 and step 508 in FIG. 5.

After decoding the barcodes at step 1606, the result of the scanning is presented on the display at step 1616. The result of the scanning includes, among other aspects, an indication of the success or failure of decoding in the form of AR overlays. As shown in FIG. 15, AR overlays 1512 are presented on the display. FIGS. 17A-17C are diagrams illustrating various scanning results in accordance with some embodiments. Various AR overlays or icons are used for various scanning results.

As shown in FIG. 17A, all barcodes in the image 112 have been successfully scanned. As discussed above, each successfully decoded barcode corresponds to an AR overlay (e.g., a blue AR overlay). For example, barcode 114-a corresponds to AR overlay 1512-a, which is a blue AR icon with a white checkmark inside it.

As shown in FIG. 17B, three barcodes have not been successfully decoded. As a result, three AR overlays (e.g., three yellow AR overlays) are generated, corresponding to the three barcodes that have not been successfully decoded. For example, the barcode 114-b corresponds to the AR overlay 1512-b, which is a yellow AR icon with a black exclamation mark inside it. These yellow AR icons alert the user that the corresponding barcodes were detected but have not been decoded. This can happen when encountering a barcode that is tough to decode. The user may get real-time feedback (e.g., a forward arrow 1702) that suggests to the user to move the mobile device closer to those barcodes that have not been successfully decoded. After the user moves the mobile device closer, the real-time feedback may fade out, and the user can press the scan button (e.g., the scan button 1508 shown in FIG. 15) to rescan these barcodes. In some embodiments, input from the user can be used to correct the count of barcodes (e.g., input that instructs to add three to the count). Details of input from the user will be discussed in greater detail below.

As shown in FIG. 17C, a barcode 114-c has been successfully detected and decoded, but the item corresponding to the barcode 114-c does not belong to a count list (e.g., the count list 1504 shown in FIG. 15). This applies when a count list has been used. As a result, the item corresponding to the barcode 114-c is not supposed to appear. This can happen when there are, for example, delivery/shipment errors. Thus, an AR overlay 1512-c is presented on the display. In the example shown in FIG. 17C, the AR overlay 1512-c is a red AR icon with a white exclamation mark inside it. Consequently, the item corresponding to the barcode 114-c should not be considered when counting barcodes. In some embodiments, input from the user can be used to correct the count of barcodes (e.g., subtract one from the count if mistakenly counted). Details of input from the user will be discussed in greater detail below.

Figure 17D:
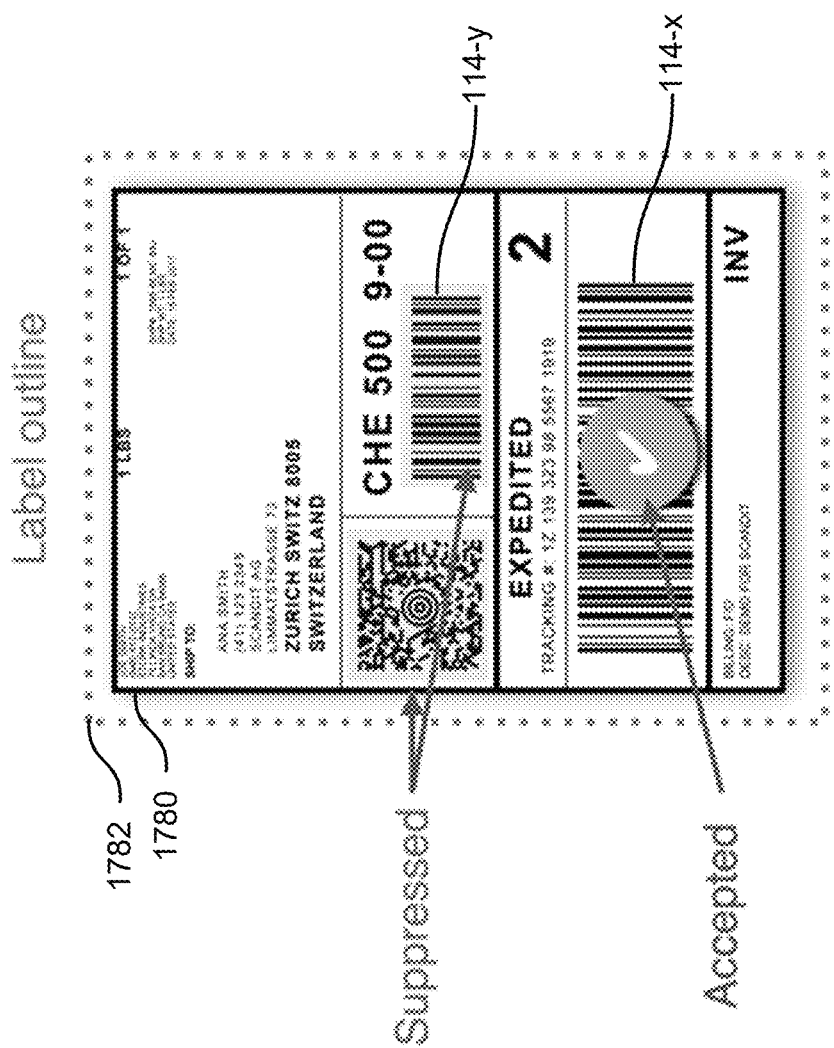
FIG. 17D is a diagram illustrating a label including barcodes not of interest in accordance with some embodiments.

E. Contextual Barcode Filtering when Non-Relevant Barcodes are Outside of the Decoding Range In some use cases, there can be a lot of barcodes in the scene that are not of interest for the capture workflow (e.g., if parcel labels contain multiple barcodes, which is fairly common). FIG. 17D is a diagram illustrating a label including barcodes not of interest in accordance with some embodiments. In the example shown in FIG. 17D, a label 1780 contains, among other things, a barcode 114-x that is of interest and a barcode 114-y that is not of interest. The barcode 114-y that is not of interest should be suppressed or filtered out.

If all barcodes are of equal size, the irrelevant barcodes can, for example, be filtered by a user-defined content filter after decoding (e.g., the first few symbols must match a certain pattern).

However, it is often the case that the user would be positioned at a range where scanning of the relevant barcodes is feasible, but the irrelevant barcodes might be too small and, therefore, can only be detected but not decoded. As a result, a content-based filter cannot be applied, and the user would see a lot of orange exclamation marks (like the one shown in FIG. 17B) on the display, indicating that some barcodes could not be scanned. Since those barcodes are not of interest, the corresponding pop-ups can be rather disrupting the workflow, especially when there are many.

In some embodiments, the barcodes that are not of interest and out of the decoding range (a content-based filter can thus not be applied) can be filtered by taking the context of the scanning scenario into account (e.g., by analyzing the local surrounding of the barcode, detecting label or product outlines 1782, and filtering detected-only barcodes that do not comply with the definition of a relevant code, as shown in FIG. 17D). As an example, the application could be configured to consider only the biggest barcode (e.g., the barcode 114-x in the example shown in FIG. 17D) on each label or to consider only barcodes that are at certain positions (e.g., the bottom portion, as shown in FIG. 17D) of the label. Detections that do not meet the defined criteria (e.g., sizes, positions, etc.) are suppressed and not considered for the display of an exclamation mark or a checkmark.

Figure 18:
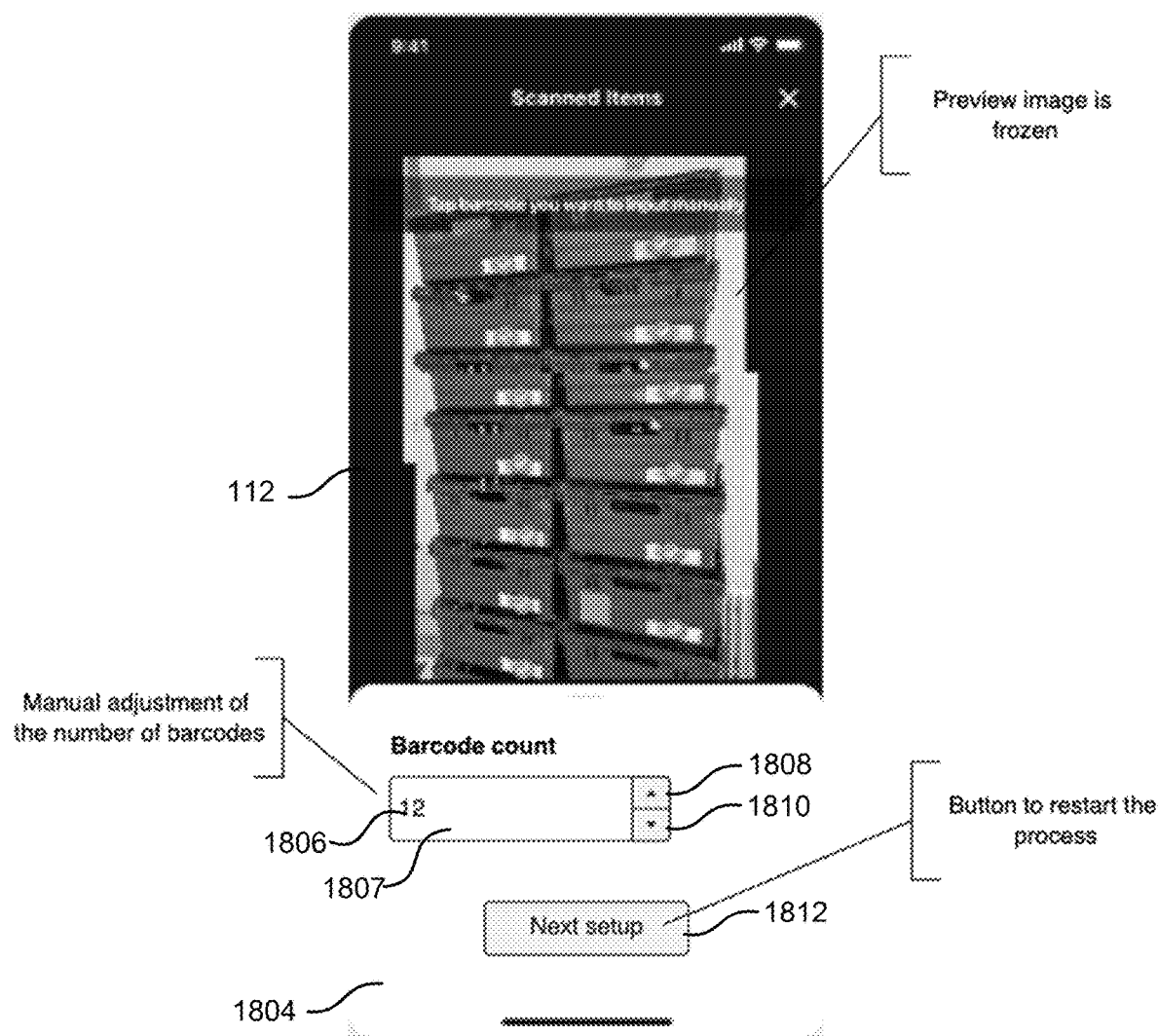
FIG. 18 is a diagram illustrating a user interface presenting a count of barcodes in accordance with some embodiments.

Referring back to FIG. 16, the result of the scanning is presented on the display at step 1616. The result of the scanning further includes, among other aspects, a count of barcodes. At step 1608, the count of barcodes is presented on the display. FIG. 18 is a diagram illustrating a user interface presenting a count of barcodes in accordance with some embodiments. In the example shown in FIG. 18, a barcode count section 1804 is presented on the display 1502. The barcode count section 1804 includes, among other things, a count of barcodes (alternatively, a "barcode count") 1806, a first button 1808, and a second button 1810. The count of barcodes 1806 is the current count of barcodes counted by the application in the image 112, which is a preview image that has been frozen.

The count of barcodes 1806, although having a high accuracy rate, may still be erroneous due to, for example, a glare on at least one barcode, a failure in barcode decoding, and/or at least one barcode outside the field of view of the camera. Therefore, it can be meaningful to provide some mechanisms to adjust or correct the count of barcodes 1806. In the example shown in FIG. 18, the user can use the first button 1808 to manually increase the count of barcodes 1806 (e.g., the increment is one) and the second button 1810 to manually decrease the count of barcodes 1806 (e.g., the increment is one). It should be understood that increment values other than one may be used or configured in other embodiments. In some embodiments, the user may directly input the adjusted count of barcodes 1806 by pressing a blank 1807 presented on the display and inputting the correct count, for example, by using a floating keyboard that appears after the blank 1807 is selected. In some embodiments, the user may press on the location in the image 112 that contains a barcode that was not detected or decoded by the application to increment the count of barcodes 1806.

It should be understood these examples are not intended to be limiting, and other suitable mechanisms (e.g., a voice instruction received by the microphone of the mobile device 202, a blink or other signals obtained by an eye-tracking device integrated into the mobile device 202, etc.) may be employed in some embodiments and are within the contemplation of the disclosure.

Referring back to FIG. 16, the user may generate an input (alternatively, a "user input") based on the count of barcodes 1806 shown in FIG. 18 and the AR overlays 1512-a, 1512-b, and/or 1512-c shown in FIGS. 17A-C. The input can be in the form of, for example, pressing the first button 1808 and/or the second button 1810 shown in FIG. 18, a voice instruction, etc. At step 1618, the input is detected by the mobile device. For example, the display 1502 shown in FIG. 18 is a touch screen, which can detect the input signal when the user presses the first button 1808 and/or the second button 1810. As another example, the microphone of the mobile device can detect a voice instruction (e.g., a sentence or phrase like "Hi MatrixScan, please increase the barcode count by two."). At step 1610, the mobile device receives and processes the input detected by the mobile device. It should be understood that step 1618 and step 1610 can be combined into one step in some embodiments.

At step 1612, the count of the barcode is adjusted according to the input. For instance, the current value of the count of barcodes 1806 in FIG. 18 is twelve, but the correct value should be thirteen. Based on the input, the count of barcodes 1806 is adjusted from twelve to thirteen.

At step 1614, a confirmation of the count of the barcode 1806 is received. The confirmation concludes the counting process, and the user can either stop counting or get started for another task (e.g., counting items in another location in the warehouse). In the example shown in FIG. 18, a confirmation button 1812 is presented on the display 1502. The user can conclude the counting process by pressing the confirmation button 1812. In some embodiments, a prompt (e.g., "Barcode count confirmed or not?") pops up, and the user selects "YES" to proceed. In some embodiments, the counting process can be concluded if no input is received from the user for a predetermined period (e.g., sixty seconds or thirty seconds).

Figure 19:
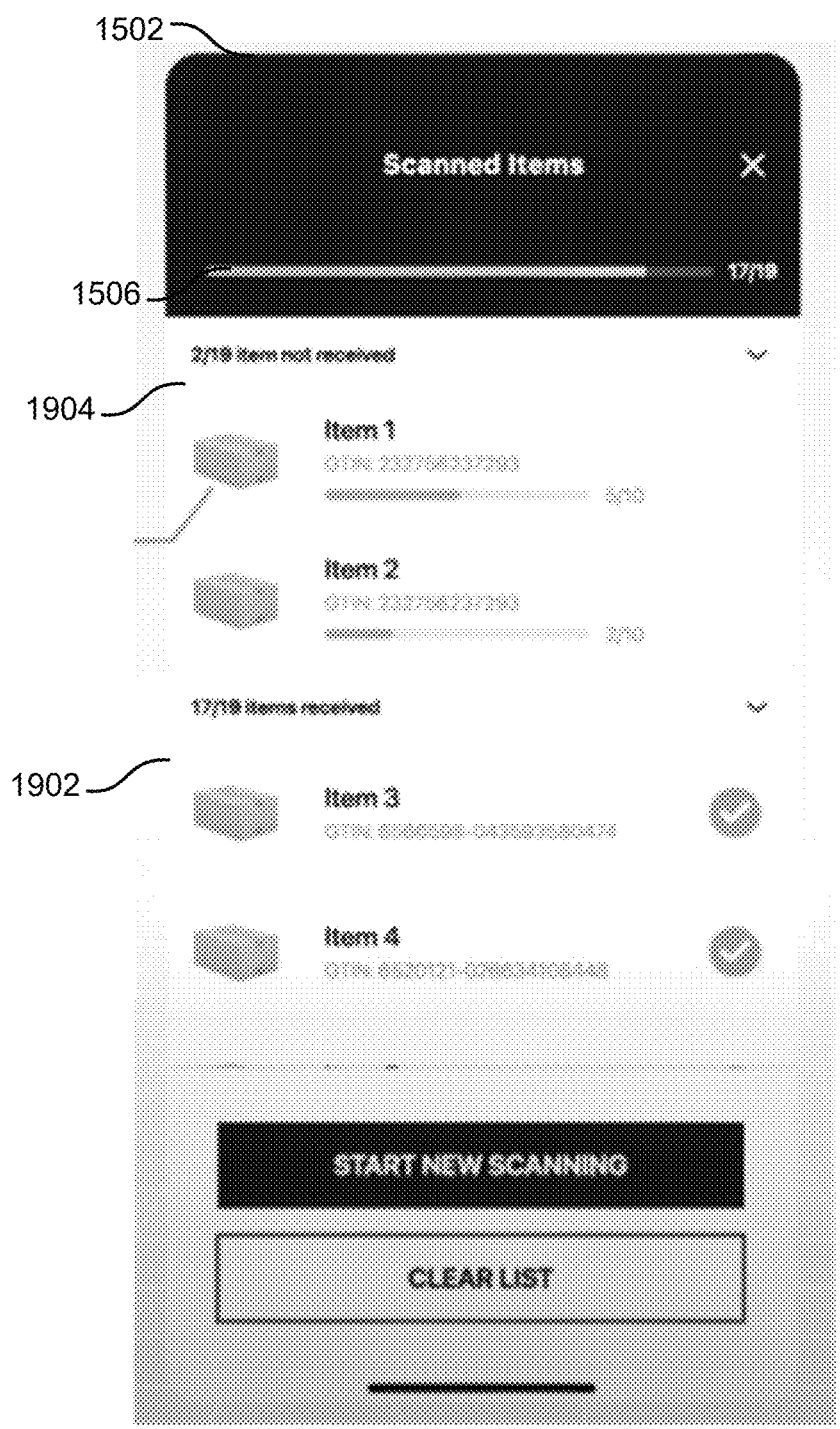
FIG. 19 is a diagram illustrating a user interface including a list of scanned items in accordance with some embodiments.

As mentioned above, in some situations, the items are counted against a list of expected items. At step 1620, the decoded barcodes are counted against the list of expected items after the barcodes have been decoded at step 1606. At step 1622, a list of scanned items is presented on the display as a result of counting. FIG. 19 is a diagram illustrating a user interface including a list of scanned items in accordance with some embodiments. In the example shown in FIG. 19, a list of scanned items 1902 is presented on the display 1502 in addition to the progress bar 1506, which has been discussed above with reference to FIG. 15. The list of scanned items 1902 includes the items (e.g., all the items) that have been successfully scanned (i.e., corresponding barcodes detected and decoded in an area of interest). In the example shown in FIG. 19, seventeen out of nineteen items on the list of expected items have been successfully scanned, and each scanned item is visualized by an icon (in the form of a package) with a unique ID and/or grouped into categories of similar barcodes. The user can scroll on the display 1502 to view the detailed information of the scanned items.

A list of failed items 1904 is also presented on the display 1502. The list of failed items 1904 includes items that have not been successfully scanned. In the example shown in FIG. 19, two out of nineteen items on the list of expected items have not been successfully scanned. Likewise, each failed item is visualized by an icon (in the form of a package) with a unique ID and/or grouped into categories of similar barcodes. The user can scroll on the display 1502 to view the detailed information of the failed items. As such, the user can investigate what happened and focus on the failed items, thereby boosting efficiency.

Figure 20:
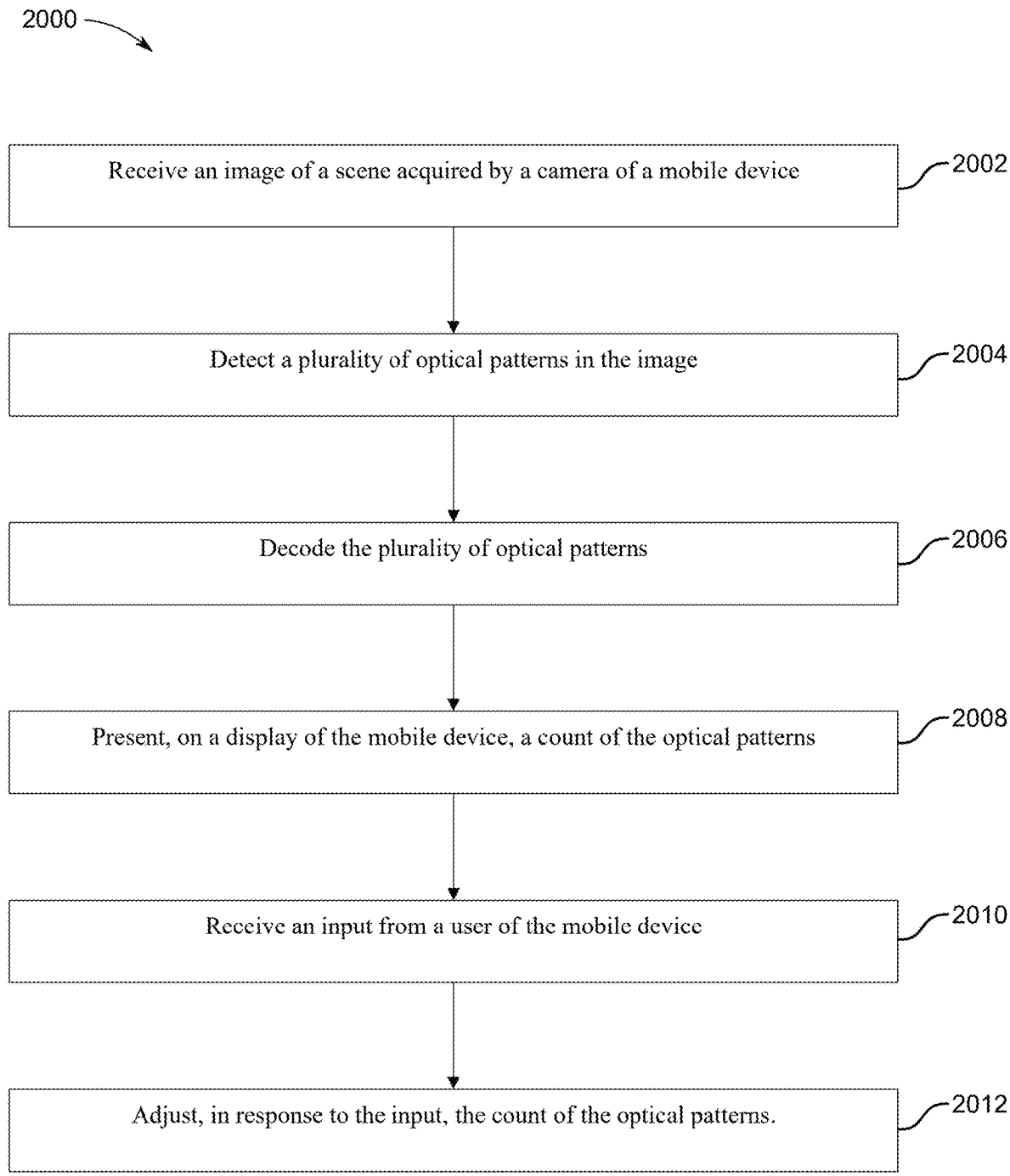
FIG. 20 is a flowchart diagram illustrating a method for counting barcodes in accordance with some embodiments.

FIG. 20 is a flowchart diagram illustrating a method for counting barcodes in accordance with some embodiments. In the example shown in FIG. 20, the method 2000 includes steps 2002, 2004, 2006, 2008, 2010, and 2012. Additional steps may be performed. Also, it should be understood that the sequence of the various steps discussed above with reference to FIG. 20 is provided for illustrative purposes, and as such, other embodiments may utilize different sequences. These various sequences of steps are to be included within the scope of embodiments.

At step 2002, an image (e.g., the image 112 shown in FIG. 15) of a scene acquired by a camera of a mobile device is received. At step 2004, a plurality of optical patterns (e.g., the barcodes 114 shown in FIG. 15) in the image are detected (e.g., similar to step 1604 discussed above with reference to FIG. 16). At step 2006, the plurality of optical patterns are decoded (e.g., similar to step 1606 discussed above with reference to FIG. 16).

At step 2008, a count of the optical patterns (e.g., the count 1806 shown in FIG. 18) is presented on a display of the mobile device. At step 2010, an input is received from a user of the mobile device (e.g., similar to step 1610 discussed above with reference to FIG. 16). At step 2012, the count of the optical patterns is adjusted in response to the input (e.g., similar to step 1612 discussed above with reference to FIG. 16).

E. Fixing the Incorrect Barcode Count Using Another Image

In some embodiments, not all the barcodes in a single image are successfully decoded. As discussed above with reference to FIG. 18, the count of barcodes 1806 can therefore be incorrect. Although the input from the user can fix the incorrect barcode count with a certain level of flexibility, it can be advantageous to fix the incorrect barcode count by mechanisms in addition to or in lieu of using manual entry.

One mechanism is using another image. As mentioned above, one reason for the failure of decoding a barcode is glare caused by reflection of light in the environment. For example, a ceiling light on top of the items piled up in the warehouse emits a beam of light with a high brightness that happens to be reflected by a label of a barcode. In such a situation, a small amount of movement of the mobile device (and therefore the camera of the mobile device) relative to the scene may eliminate the glare or reduce the extent of it so that it will not impact the success rate of decoding the barcode.

Figure 21:
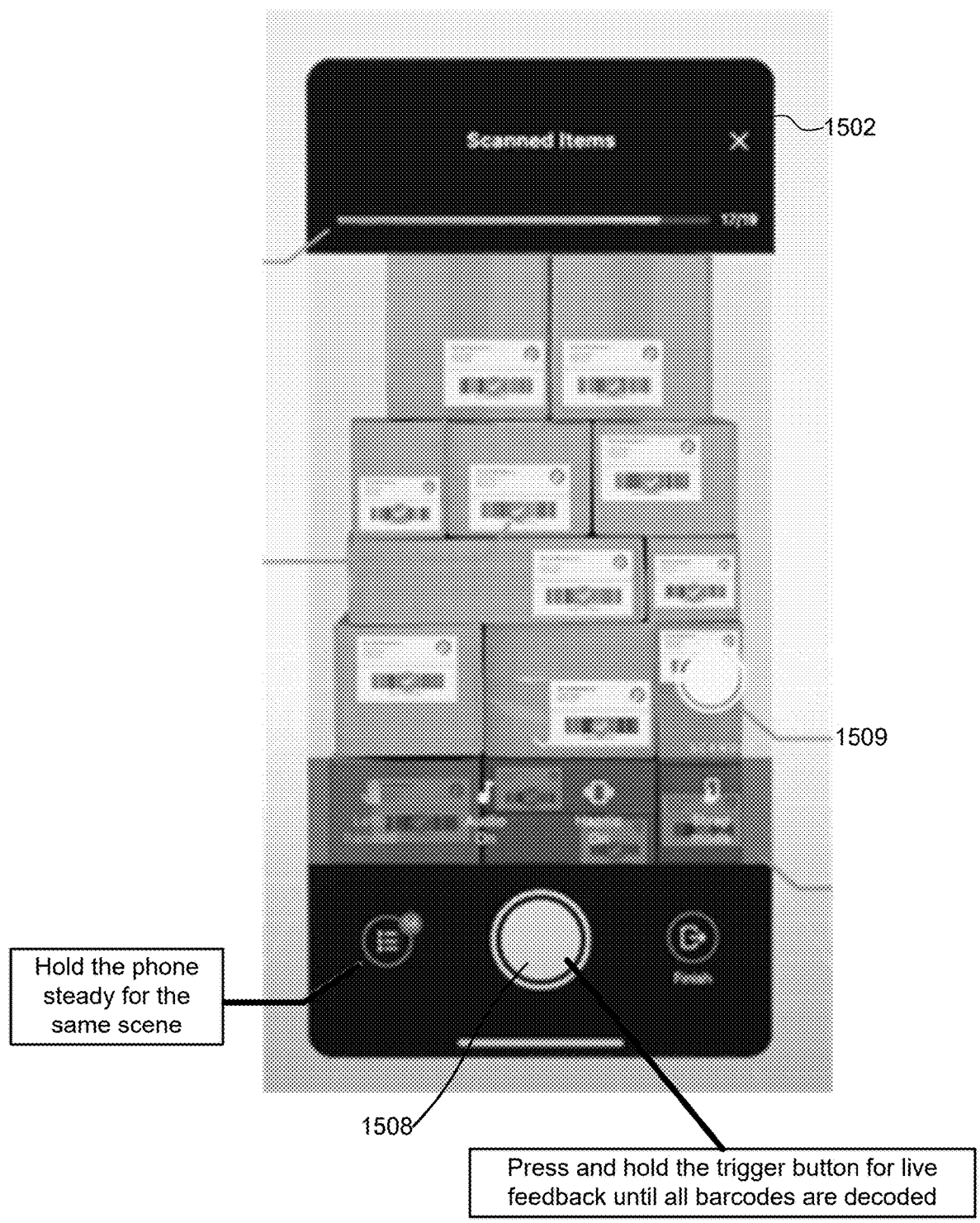
FIG. 21 is a diagram illustrating a user interface when another image is chosen and used for barcode scanning in accordance with some embodiments.
Figure 22:
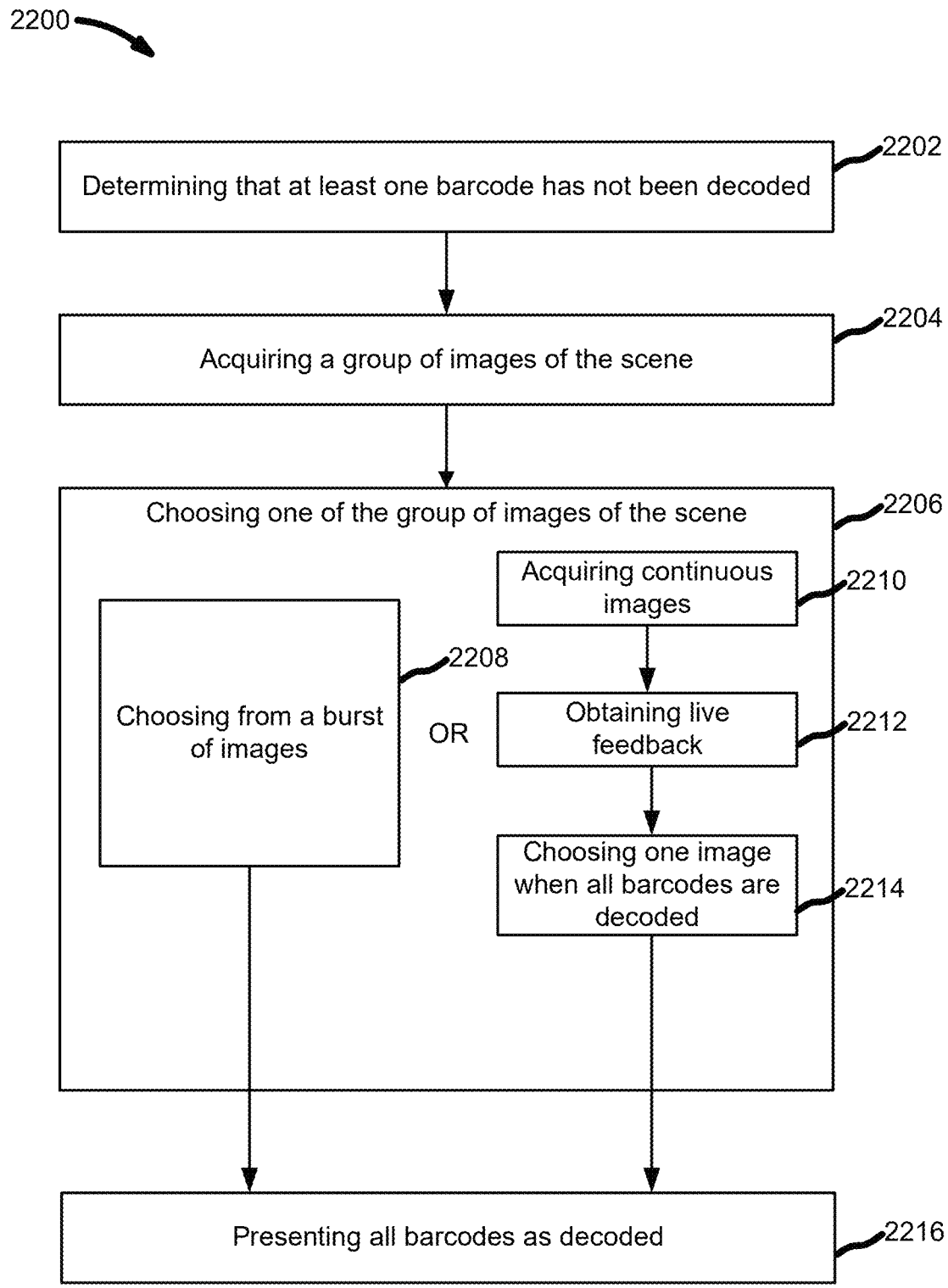
FIG. 22 is a flowchart diagram illustrating a workflow in accordance with some embodiments.

FIG. 21 is a diagram illustrating a user interface when another image is chosen and used for barcode scanning in accordance with some embodiments. FIG. 22 is a flowchart diagram illustrating a workflow 2200 in accordance with some embodiments.

At step 2202, it is ascertained that at least one barcode has not been successfully decoded. This could be a situation shown in FIG. 17B. The user interface presents at least one AR overlay 1512-b, suggesting that a rescan is recommended.

At step 2204, a group of images of the scene are acquired. In some embodiments, the group of images of the scene may be a burst of images. The burst of images are multiple high-speed images taken by the camera of the mobile device, and these images are close to each other as they are temporarily close to each other. For example, the burst of images are acquired in less than 2, 1, or 0.5 seconds by the camera. However, one of these images may be better than others for the purpose of decoding barcodes.

In some embodiments, real-time images are acquired as the user holds the mobile device steady for the same scene, as shown in FIG. 21. The processor of the mobile device may detect and decode the barcodes on the fly, and/or AR overlays like those shown in FIGS. 17A-C may be presented on the display 1502 as live feedback. The trigger button (e.g., button 1508 or 1509) is pressed and held until the live feedback suggests that all the barcodes have been successfully decoded. The trigger button can be repurposed to some extent (e.g., allowing the user to control an interval of images by pressing and holding the trigger button until the user is satisfied with the barcodes decoded). The interval can be adjusted by use (e.g., by determining how long the trigger button is held). Likewise, these images are close to each other as the user holds the mobile device steady.

At step 2206, one or more of the group of images of the scene is chosen. The chosen image(s) is the best fit among the group of images for decoding barcodes. In the embodiment where a burst of images is acquired, one of the burst of images is chosen (step 2208). In some embodiments, a rolling buffer is used for detecting and decoding barcodes (e.g., analyzing the last 10, 30, 60, or 120 images). The processor of the mobile device can attempt to scan and decode all barcodes, and choose one when all the barcodes are decoded. It should be understood that "all" means all the barcodes that have been detected in the image. In one example, the last ten images acquired are analyzed, though other numbers may be employed in other embodiments. In some embodiments, multiple images are used. For example, if there are seven barcodes detected, five barcodes could be decoded using a first image and two barcodes could be decoded using a second image.

In some embodiments, where real-time images are acquired, three steps are implemented. At step 2210, continuous images are acquired. The processor of the mobile device is configured to detect and decode barcodes in one or more of these images. At step 2212, live feedback is obtained and presented. As discussed above, AR overlays like those shown in FIGS. 17A-C may be presented on the display 1502 as live feedback. At step 2214, one image is chosen when the live feedback suggests that all the barcodes are decoded. Again, it should be understood that "all" means all the barcodes that have been detected in the image. The chosen image may freeze on the display 1502 showing all barcodes are decoded.

At step 2216, all barcodes are shown as decoded based on the chosen image or multiple images. This concludes this workflow 2200. As such, the count of barcodes should be correct.

F. Fixing the Incorrect Barcode Count Using Automatic Scene Detection

In some embodiments, not all the barcodes in the single image are successfully decoded. As discussed above with reference to FIG. 18, the count of barcodes 1806 is therefore incorrect. Another alternative mechanism to fix the incorrect barcode count is by changing the scene (e.g., by moving closer or zooming in) and/or the viewing angle of the scene.

In some embodiments, the scene change can be detected from user input. In other embodiments, the scene change can be detected based on automatic scene change detection implemented by the processor of the mobile device.

Figure 23:
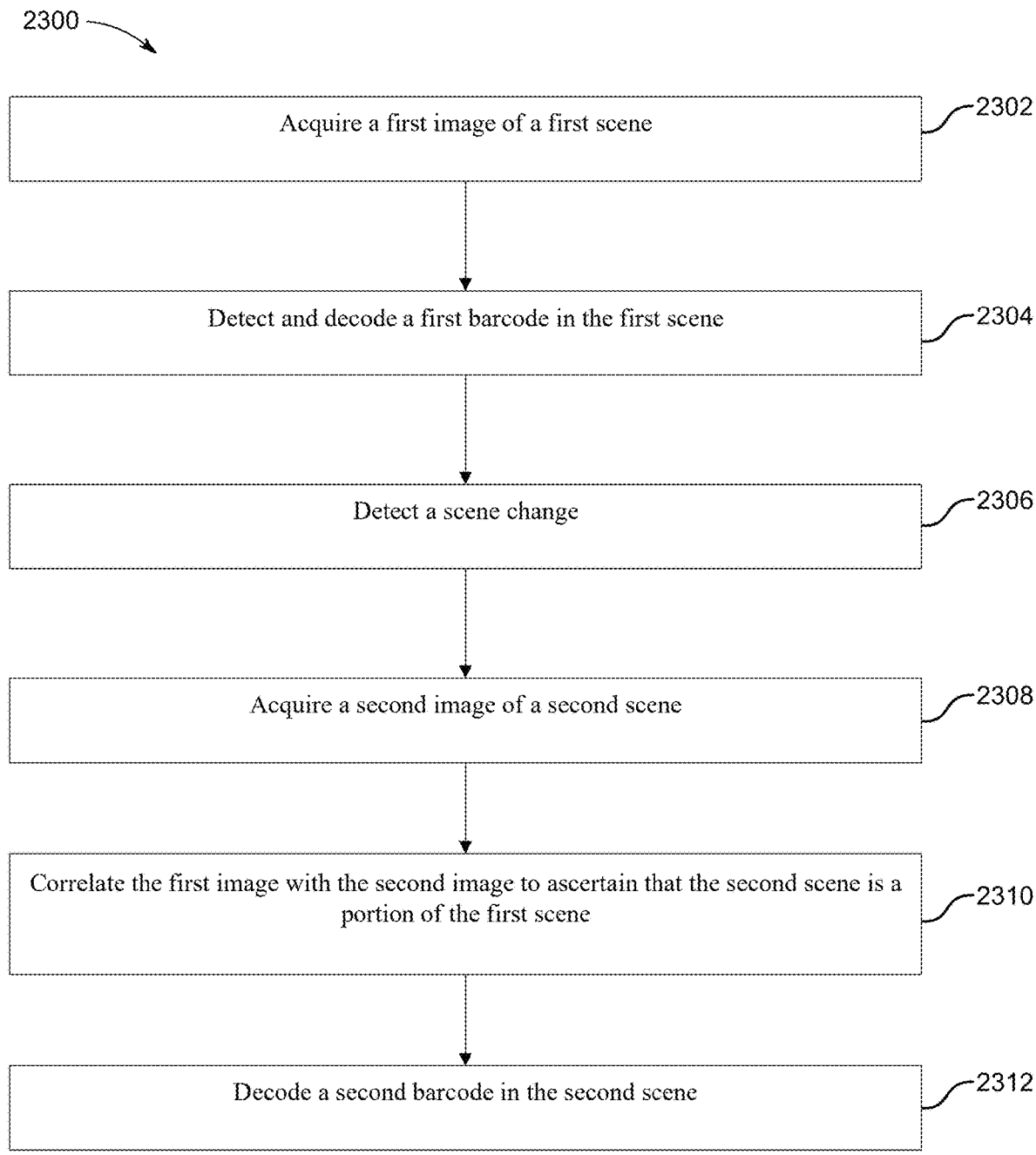
FIG. 23 is a flowchart diagram illustrating a workflow in accordance with some embodiments.

FIG. 23 is a flowchart diagram illustrating a workflow 2300 in accordance with some embodiments. At step 2302, a first image of a first scene is acquired. Step 2302 is similar to step 1602 discussed above with reference to FIG. 16 and step 2002 discussed above with reference to FIG. 20. In some embodiments, the first image is one of multiple images of the first scene.

At step 2304, a first barcode is detected and decoded in the first scene. Step 2304 is similar to steps 1604 and 1606 discussed above with reference to FIG. 16 and steps 2004 and 2006 discussed above with reference to FIG. 20. It should be understood that in some embodiments, the first barcode can be one of several barcodes detected and decoded.

At step 2306, a scene change is detected. As mentioned above, the scene change can be detected from user input. A trigger button like that shown in FIG. 21 can be used to control barcode scanning, and a second button can be included in the user interface to notify the application that the user intends to change the scene (e.g., from the first scene to the second scene). For example, the user can press a second button and then move the mobile device closer to a barcode that was not decoded and/or not detected for the system to run a decode and/or detect algorithm on an image where the barcode that wave previously not decoded and/or not detected is larger or of better image quality than previously.

In some embodiments, scene change detection can be based on automatic scene change detection. In this situation, only the trigger button is used (e.g., there is not a second button to notify the application that the user intends to change the scene). In other words, one button, instead of two buttons, is used. In some implementations, the automatic scene change detection is based on calculating the correlation (of feature points) between the first scene and the second scene.

At step 2308, a second image of a second scene is acquired. Step 2308 can be similar to step 1602 discussed above with reference to FIG. 16 and step 2002 discussed above with reference to FIG. 20. In some embodiments, the second image is one of multiple images of the second scene.

At step 2310, the first image is correlated with the second image to ascertain that the second scene is a portion of the first scene. In other words, after the scene change, the second scene is a "zoomed-in" scene of the first scene. The "zoomed-in" scene enables the decoding of one or more barcodes that are previously not able to be decoded and/or detected.

At step 2312, a second barcode is decoded in the second scene. Step 2312 can be similar to steps 1604 and 1606 discussed above with reference to FIG. 16 and steps 2004 and 2006 discussed above with reference to FIG. 20. It should be understood that in some embodiments, the second barcode is one of multiple barcodes.

The second barcode is detected but not decoded in the first image of the first scene. In other words, the second barcode is a barcode that was unsuccessfully decoded and/or detected in the first scene. Since the second barcode is now decoded in the second scene, the count of barcodes has been corrected accordingly.

In some embodiments, a Fourier transform is used to match the second view to the first view (e.g., on a whole image or on feature points. A down-sampled image patch can be used for correlation. One or more assumptions can be used to help (e.g., simplify) correlations. For example, an assumption that the scenes are in the same plane and/or that the second scene is of a different scale than the first image can be used to correlate the second image to the first image. In some embodiments, barcode tracking and/or using a sub-image near a barcode can be used to correlate images. Data from one or more inertial measurement units (IMUs) can be used to detect movement of the camera and/or estimate movement of the camera. Data from an IMU can be used for motion and/or scale obtained using a known size of a barcode, data from a LiDAR sensor, from stereo cameras, and/or using a SLAM (Simultaneous Localization and Mapping) algorithm. Freezing an image on the display can be used for correlating images. For image, an overview image can be frozen, a second image acquired (e.g., by pressing the trigger button), and the system correlates the second image based on assuming the second image is part of the first image (e.g., based on barcode positions in the first image and the second image and/or a region around one or more barcodes).

For situations where there is not a large movement of the camera from one image to another, scenes can be compared and/or results fused. In some embodiments, if there is n % (e.g., n is equal to or greater than 70, 75, 80, or 95) of barcode correlation from a first image and a second image, then the system can conclude that the scene is the same. For example, if 80% of barcode and/or barcode spacing (e.g., barcode spacing pattern) is the same from a second image to a first image, then the system assumes the images are of the same set of barcodes to be decoded and the images are aligned with each other. In some embodiments, barcodes as unique markers in images are used to correlate images. In some configurations, an overall view is used and the second image is projected onto the overall view. If not enough correlation is calculated, an error message can be presented on the display.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for optical pattern scanning, the system comprising:
   a mobile device comprising a camera and a display; and
   one or more memory devices comprising instructions that, when executed, cause one or more processors to perform the following steps:
   receiving an image of a scene acquired by the camera of the mobile device;
   detecting a plurality of optical patterns in the image;
   decoding the plurality of optical patterns;
   presenting, on the display of the mobile device, a count of the optical patterns;
   receiving an input from a user of the mobile device; and
   adjusting, in response to the input, the count of the optical patterns.

2. The system of claim 1, wherein the camera is part of a hand-held, mobile device.

3. The system of claim 1, wherein the plurality of optical patterns are identical.

4. The system of claim 1, wherein the input comprises pressing a first button to increase the count of the optical patterns.

5. The system of claim 1, wherein the instructions, when executed, cause the one or more processors to further perform the following steps:
   presenting, on the display of the mobile device, an indication of decoded optical patterns; and
   detecting the input from the user, wherein the input is generated by the user based at least in part on the indication of decoded optical patterns.

6. The system of claim 5, wherein the indication of decoded optical patterns comprises a plurality of augmented reality (AR) overlays, each of the plurality of AR overlays corresponding to one of the decoded optical patterns.

7. A method comprising:
   receiving an image of a scene acquired by a camera of a mobile device;
   detecting a plurality of optical patterns in the image;
   decoding the plurality of optical patterns;
   presenting, on a display of the mobile device, a count of the optical patterns;
   receiving an input from a user of the mobile device; and
   adjusting, in response to the input, the count of the optical patterns.

8. The method of claim 7, wherein the plurality of optical patterns are identical.

9. The method of claim 7, wherein the input comprises pressing a first button to increase the count of the optical patterns.

10. The method of claim 9, wherein the input comprises pressing a second button to decrease the count of the optical patterns.

11. The method of claim 7, wherein the input comprises manually inputting the count of the optical patterns.

12. The method of claim 7, further comprising:
    presenting, on the display of the mobile device, an indication of decoded optical patterns; and
    detecting the input from the user, wherein the input is generated by the user based at least in part on the indication of decoded optical patterns.

13. The method of claim 12, wherein the indication of decoded optical patterns comprises a plurality of augmented reality (AR) overlays, each of the plurality of AR overlays corresponding to one of the decoded optical patterns.

14. The method of claim 13, wherein the indication of decoded optical patterns further comprises at least one AR overlays, each of the at least one AR overlays corresponding to an optical pattern that has not been decoded.

15. The method of claim 7, further comprising acquiring a depth map of the scene by a ranging system using a laser.

16. The method of claim 7, further comprising:
comparing the decoded optical patterns against a list of expected items; and
presenting, on the display of the mobile device, a list of scanned items based on comparing the decoded optical patterns against the list of expected items.

17. The method of claim 7, wherein the image is one of multiple images of the scene.

18. The method of claim 17, further comprising tracking a position of a first barcode across the multiple images without decoding the first barcode in each of the multiple images.

19. A memory device comprising instructions that, when executed, cause one or more processors to perform the following steps:
receiving an image of a scene acquired by a camera of a mobile device;
detecting a plurality of optical patterns in the image;
decoding the plurality of optical patterns;
presenting, on a display of the mobile device, a count of the optical patterns;
receiving an input from a user of the mobile device; and
adjusting, in response to the input, the count of the optical patterns.

20. The memory device of claim 19, wherein the plurality of optical patterns are identical.

* * * * *